(12) United States Patent
Yapici et al.

(10) Patent No.: US 12,470,312 B2
(45) Date of Patent: Nov. 11, 2025

(54) HARMONIC DIVISION MULTIPLEXING FOR RECONFIGURABLE INTELLIGENT SURFACES

(71) Applicant: QUALCOMM Incorporated, San Diego, CA (US)

(72) Inventors: Yavuz Yapici, Florham Park, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/347,772

(22) Filed: Jul. 6, 2023

(65) Prior Publication Data
US 2025/0015913 A1 Jan. 9, 2025

(51) Int. Cl.
*H04J 1/10* (2006.01)
*H04B 7/04* (2017.01)

(52) U.S. Cl.
CPC ............ *H04J 1/10* (2013.01); *H04B 7/04013* (2023.05)

(58) Field of Classification Search
CPC ............................... H04J 1/10; H04B 7/04013
See application file for complete search history.

(56) References Cited

U.S. PATENT DOCUMENTS

2022/0059943 A1* 2/2022 Saab ................. H04B 7/0617
2024/0275553 A1* 8/2024 Sun ..................... H04L 25/02

* cited by examiner

*Primary Examiner* — Ashley Shivers
(74) *Attorney, Agent, or Firm* — Holland & Hart LLP

(57) ABSTRACT

Methods, systems, and devices for wireless communication are described. A first wireless communication device may set parameter(s) corresponding to column(s) of a reconfigurable intelligent surface (RIS) based on a periodic coding sequence. Based on the parameter(s), the first wireless communication device may transmit a first signal to a second wireless communication device in a first direction using a first harmonic frequency, and may transmit a second signal to a third wireless communication device in a second direction using a second harmonic frequency. The second wireless communication device may decode the first signal based on the periodic coding sequence and the first harmonic frequency, and the third wireless communication device may decode the second signal based on periodic coding sequence and the second harmonic frequency. The first wireless communication device may similarly set second parameter(s) of the RIS based on a second periodic coding sequence.

30 Claims, 13 Drawing Sheets

HARMONIC DIVISION MULTIPLEXING FOR RECONFIGURABLE INTELLIGENT SURFACES

FIELD OF TECHNOLOGY

The following relates to wireless communication, including harmonic division multiplexing (HDM) for reconfigurable intelligent surfaces (RISs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support harmonic division multiplexing (HDM) for reconfigurable intelligent surfaces (RISs). For example, the described techniques provide for a wireless communication device to transmit different data streams to different receiving devices by implementing an RIS at the wireless communication device. In some examples, the wireless communication device (e.g., a network entity or a user equipment (UE)) may transmit a signal by setting one or more parameters of columns of an RIS (e.g., phase value introduced to an incident signal by adjusting an impedance of reconfigurable elements) at the device and reflecting an incident wave off of the RIS. By applying the periodic coding sequence, which may correspond to an intended symbol (e.g., representing a string of bits), the RIS may modulate the incident wave to create a reflected wave which is modulated according to an intended symbol. To change a direction of the signal to reach a target receiving device, the network entity may adjust a phase matrix of the RIS periodically (e.g., based on a periodic coding sequence) such that the reflected wave is steered towards a desired direction on a shifted carrier frequency which may deviate from the carrier frequency of the incident signal by a harmonic frequency corresponding to the periodic coding sequence. In addition, the network entity may apply a time delay to adjust a phase offset between elements (e.g., individually, by column) of the RIS to alter a direction of a reflected harmonic frequency wave. Thus, the wireless communication device may multiplex one or more transmissions transmitted to different receiving devices by using different harmonic frequencies corresponding directions of the receiving devices, by fine tuning a transmission direction, and by reconfiguring the RIS according to different periodic coding sequences.

A method for wireless communication by a first wireless communication device is described. The method may include setting one or more parameters corresponding to one or more columns of a reconfigurable intelligent surface (RIS) based on a periodic coding sequence, transmitting a first signal to a second wireless communication device using a first harmonic frequency based on the one or more parameters, and transmitting a second signal to a third wireless communication device using a second harmonic frequency different from the first harmonic frequency based on the one or more parameters.

A first wireless communication device for wireless communication is described. The first wireless communication device may include one or more memories storing processor-executable code and one or more processors coupled with the one or more memories. The one or more processors may be individually or collectively operable to execute the code to cause the first wireless communication device to set one or more parameters corresponding to one or more columns of a reconfigurable intelligent surface (RIS) based on a periodic coding sequence, transmit a first signal to a second wireless communication device using a first harmonic frequency based on the one or more parameters, and transmit a second signal to a third wireless communication device using a second harmonic frequency different from the first harmonic frequency based on the one or more parameters.

Another first wireless communication device for wireless communication is described. The first wireless communication device may include means for setting one or more parameters corresponding to one or more columns of a reconfigurable intelligent surface (RIS) based on a periodic coding sequence, means for transmitting a first signal to a second wireless communication device using a first harmonic frequency based on the one or more parameters, and means for transmitting a second signal to a third wireless communication device using a second harmonic frequency different from the first harmonic frequency based on the one or more parameters.

A non-transitory computer-readable medium storing code for wireless communication by a first wireless communication device is described. The code may include instructions executable by one or more processors to set one or more parameters corresponding to one or more columns of a reconfigurable intelligent surface (RIS) based on a periodic coding sequence, transmit a first signal to a second wireless communication device using a first harmonic frequency based on the one or more parameters, and transmit a second signal to a third wireless communication device using a second harmonic frequency different from the first harmonic frequency based on the one or more parameters.

In some examples of the method, wireless communication devices, and non-transitory computer-readable medium described herein, transmitting the first signal using the first harmonic frequency and transmitting the second signal using the second harmonic frequency may include operations, features, means, code, or instructions for transmitting the first signal in a first direction associated with the second wireless communication device based on the one or more parameters and transmitting the second signal in a second direction different from the first direction and associated with the third wireless communication device based on the one or more parameters.

In some examples of the method, wireless communication devices, and non-transitory computer-readable medium described herein, the first direction may be based on a first phase shift corresponding to a first time delay applied to the periodic coding sequence and the second direction may be based on a second phase shift corresponding to a second time delay applied to the periodic coding sequence.

In some examples of the method, wireless communication devices, and non-transitory computer-readable medium described herein, the first direction may be based on the first harmonic frequency and a base frequency and the second direction may be based on the second harmonic frequency and the base frequency.

Some examples of the method, wireless communication devices, and non-transitory computer-readable medium described herein may further include operations, features, means, code, or instructions for generating, at the RIS based on the one or more parameters, a first symbol including one or more bits corresponding to the periodic coding sequence, where the first symbol may be transmitted in the first signal and generating, at the RIS based on the one or more parameters, a second symbol including the one or more bits corresponding to the periodic coding sequence, where the second symbol may be transmitted in the second signal.

In some examples of the method, wireless communication devices, and non-transitory computer-readable medium described herein, the first symbol may be based on the first harmonic frequency and a base frequency and the second symbol may be based on the second harmonic frequency and the base frequency.

Some examples of the method, wireless communication devices, and non-transitory computer-readable medium described herein may further include operations, features, means, code, or instructions for setting one or more second parameters corresponding to the one or more columns of the RIS based on a second periodic coding sequence different from the periodic coding sequence, transmitting a third signal to a fourth wireless communication device using a third harmonic frequency based on the one or more second parameters, and transmitting a fourth signal to a fifth wireless communication device using a fourth harmonic frequency different from the third harmonic frequency based on the one or more second parameters.

In some examples of the method, wireless communication devices, and non-transitory computer-readable medium described herein, the first harmonic frequency corresponds to a first order of a base frequency and the second harmonic frequency corresponds to a second order of the base frequency different from the first order.

In some examples of the method, wireless communication devices, and non-transitory computer-readable medium described herein, the first wireless communication device includes a network entity.

In some examples of the method, wireless communication devices, and non-transitory computer-readable medium described herein, the second wireless communication device includes a first user equipment (UE) and the third wireless communication device includes a second UE.

In some examples of the method, wireless communication devices, and non-transitory computer-readable medium described herein, the first wireless communication device includes a UE and the second wireless communication device, the third wireless communication device, or both, include a network entity.

In some examples of the method, wireless communication devices, and non-transitory computer-readable medium described herein, the first wireless communication device includes the RIS and the first signal and the second signal may be transmitted using the RIS.

A method for wireless communication by a second wireless communication device is described. The method may include receiving a signal from a first wireless communication device using a harmonic frequency, where the signal is based on a periodic coding sequence and is associated with a reconfigurable intelligent surface (RIS) and decoding the signal based on the periodic coding sequence and the harmonic frequency.

A second wireless communication device for wireless communication is described. The second wireless communication device may include one or more memories storing processor-executable code and one or more processors coupled with the one or more memories. The one or more processors may be individually or collectively operable to execute the code to cause the second wireless communication device to receive a signal from a first wireless communication device using a harmonic frequency, where the signal is based on a periodic coding sequence and is associated with a reconfigurable intelligent surface (RIS) and decode the signal based on the periodic coding sequence and the harmonic frequency.

Another second wireless communication device for wireless communication is described. The second wireless communication device may include means for receiving a signal from a first wireless communication device using a harmonic frequency, where the signal is based on a periodic coding sequence and is associated with a reconfigurable intelligent surface (RIS) and means for decoding the signal based on the periodic coding sequence and the harmonic frequency.

A non-transitory computer-readable medium storing code for wireless communication by a second wireless communication device is described. The code may include instructions executable one or more processors to receive a signal from a first wireless communication device using a harmonic frequency, where the signal is based on a periodic coding sequence and is associated with a reconfigurable intelligent surface (RIS) and decode the signal based on the periodic coding sequence and the harmonic frequency.

Some examples of the method, wireless communication devices, and non-transitory computer-readable medium described herein may further include operations, features, means, code, or instructions for refraining from receiving a second signal from the first wireless communication device using a second harmonic frequency different from the harmonic frequency, where the refraining may be based on the second signal being associated with the second harmonic frequency.

In some examples of the method, wireless communication devices, and non-transitory computer-readable medium described herein, the second signal may be based on the periodic coding sequence and may be associated with a third wireless communication device.

In some examples of the method, wireless communication devices, and non-transitory computer-readable medium described herein, receiving the signal using the harmonic frequency may include operations, features, means, code, or instructions for receiving the signal in a first direction associated with the second wireless communication device, where the first direction may be different from a second direction associated with a third wireless communication device.

In some examples of the method, wireless communication devices, and non-transitory computer-readable medium described herein, the first direction may be associated with a first phase shift corresponding to a first time delay associated with the periodic coding sequence and the second direction may be associated with a second phase shift corresponding to a second time delay associated with the periodic coding sequence.

In some examples of the method, wireless communication devices, and non-transitory computer-readable medium described herein, the first direction may be based on the harmonic frequency and a base frequency and the second direction may be based on a second harmonic frequency, different from the harmonic frequency, and the base frequency.

Some examples of the method, wireless communication devices, and non-transitory computer-readable medium described herein may further include operations, features, means, code, or instructions for determining a symbol including one or more bits received in the signal based on the decoding, where the symbol corresponds to the periodic coding sequence.

In some examples of the method, wireless communication devices, and non-transitory computer-readable medium described herein, the symbol may be based on the harmonic frequency and a base frequency and may be different from a second symbol based on a second harmonic frequency, different from the harmonic frequency, and the base frequency.

Some examples of the method, wireless communication devices, and non-transitory computer-readable medium described herein may further include operations, features, means, code, or instructions for receiving a second signal from the first wireless communication device using a second harmonic frequency different from the harmonic frequency, where the second signal may be based on a second periodic coding sequence different from the periodic coding sequence and may be associated with the RIS and decoding the second signal based on the second periodic coding sequence and the second harmonic frequency.

In some examples of the method, wireless communication devices, and non-transitory computer-readable medium described herein, the harmonic frequency corresponds to a first order of a base frequency and different from a second order of the base frequency.

In some examples of the method, wireless communication devices, and non-transitory computer-readable medium described herein, the first wireless communication device includes a network entity.

In some examples of the method, wireless communication devices, and non-transitory computer-readable medium described herein, the second wireless communication device includes a UE.

In some examples of the method, wireless communication devices, and non-transitory computer-readable medium described herein, the first wireless communication device includes a UE and the second wireless communication device include a network entity.

In some examples of the method, wireless communication devices, and non-transitory computer-readable medium described herein, the first wireless communication device includes the RIS and the signal may be received from the RIS.

DETAILED DESCRIPTION

Figure 1:
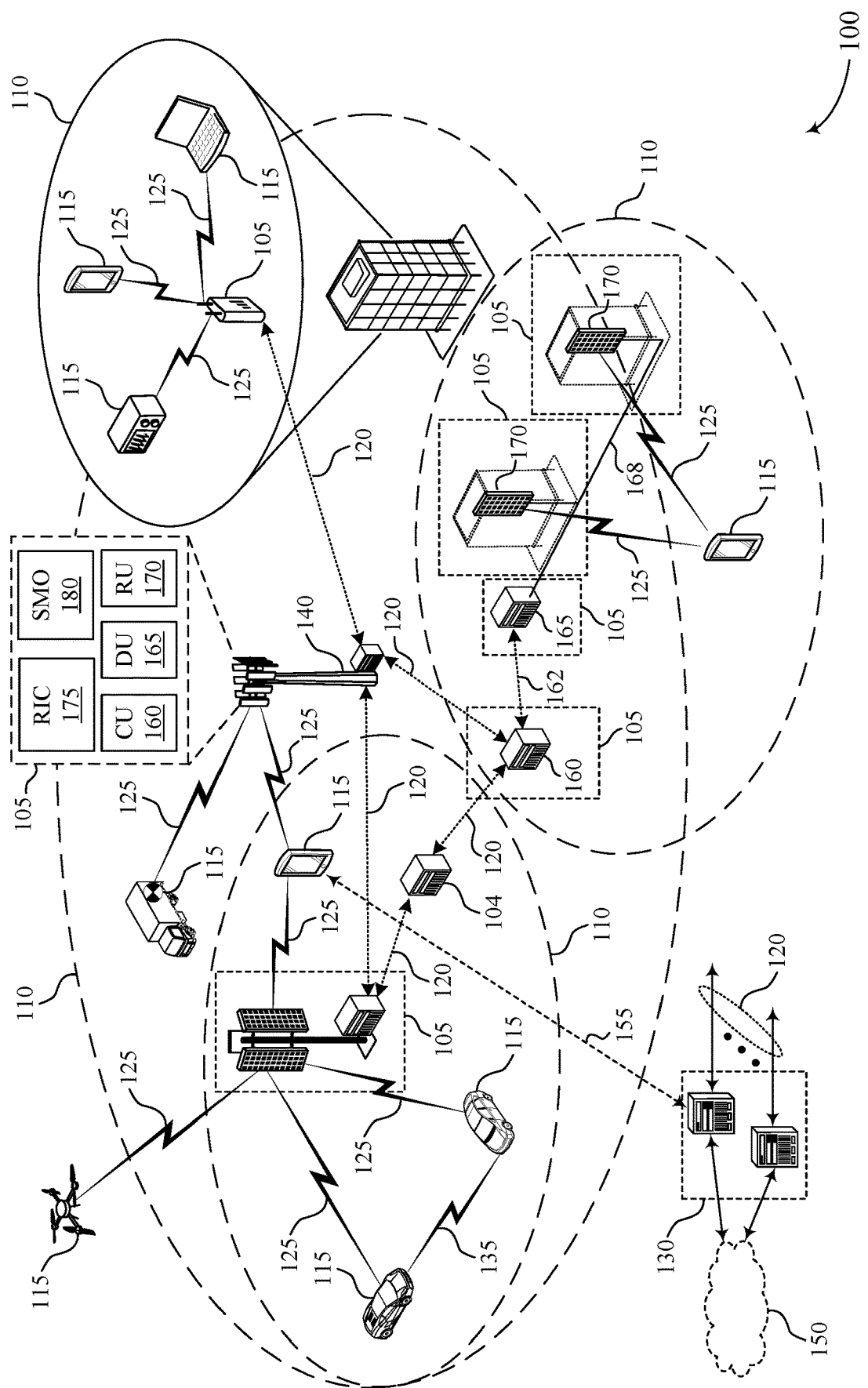
FIG. 1 shows an example of a wireless communications system that supports harmonic division multiplexing (HDM) for reconfigurable intelligent surfaces (RISs) in accordance with one or more aspects of the present disclosure.

Wireless networks may implement reconfigurable intelligent surfaces (RISs) for use in communications between one or more devices, including user equipments (UEs) and network entities. For example, an RIS may be deployed in a standalone fashion to act as a relay for reflecting signals around obstacles between two devices of a network. An RIS may include an array of passive and reconfigurable elements arranged in columns and rows. To reflect a signal, one or more parameters of the elements may be adjusted to achieve respective reflection coefficients (e.g., of each element, or column of elements) to steer a beam in a direction of a target device. In some cases, different harmonic frequency reflections may be introduced when reflecting a signal using an RIS. For example, a reflected signal may produce multiple harmonic order reflections of a carrier frequency signal, which may reduce an overall power of the reflected wave at the carrier frequency. However, further implementations remain desired for implementing efficient use of harmonic frequencies in RIS deployment.

Techniques described herein may enable RIS deployment at a transmitting device (e.g., a UE, a network entity, or another device) for transmitting signals using harmonic frequencies. For example, a device may include an RIS, and may transmit a signal by reflecting an unmodulated incident wave (e.g., from an internal RF source) using the RIS. By applying a periodic coding sequence to alter the reflection coefficients of the elements (or columns of elements) of the RIS, the device may modulate the incident wave using the RIS to create a reflected wave modulated according to a symbol (e.g., representing a string of bits). In some examples, the device may transmit a signal to multiple devices using different harmonic orders of a signal, which may be referred to as harmonic division multiplexing (HDM). For example, the device may adjust the RIS to transmit in two harmonic frequencies of different orders of a carrier frequency of the incident and reflected waves, where a first and second harmonic frequency may correspond to a direction of a first receiving device and a direction of a second receiving device, respectively. In some examples, the device may change a direction of the signal by applying a time delay to the columns of the RIS. Further, the device may periodically reconfigure the RIS with different periodic coding sequences to generate different symbols. By utilizing an RIS at a transmitting device to modulate a transmitted signal and to perform HDM, a transmitter may omit radio frequency (RF) chains, digital and analog converters, among other components, as well as multiplex transmissions, resulting in a lower cost, lower complexity hardware as well as reduced power consumption and efficient use of resources.

Aspects of the disclosure are initially described in the context of wireless communications systems. Aspects of the disclosure are further illustrated by and described with reference to RIS diagrams, signaling diagrams, and process flows that relate to HDM for RISs. Aspects of the disclosure are further illustrated by and described with reference to apparatus diagrams, system diagrams, and flowcharts that relate to HDM for RISs.

FIG. 1 shows an example of a wireless communications system 100 that supports HDM for RISs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU

170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAb donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support HDM for RISs as described herein. For example, some operations described as being performed by a UE 115 or a network entity 105 (e.g., a base station 140) may additionally, or alternatively, be performed by one or more components of the disaggregated RAN architecture (e.g., IaB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may support the use of one or more RISs (e.g., metasurfaces) in a network. For example, a RIS may be an example of an array (e.g., matrix) of passive and reconfigurable reflecting elements arranged in columns and rows. One or more parameters of each element of the RIS may be adjusted to change a direction of a reflected wave. For example, an impedance of elements may be adjusted individually or by group (e.g., column, row) to change a reflected angle of a wave. In some cases, RISs may be implemented in a standalone fashion for reflecting incoming incident waves to target devices to improve spectral efficiency (e.g., by circumventing blockages via new multipaths) at low deployment cost. For example, to circumvent an obstacle between a UE 115 and a network entity 105, the network entity 105 may first transmit a signal to an RIS (e.g., a roadside unit or other standalone device), which may in turn reflect the signal to a target UE 115 by changing parameters of elements of the RIS to align the signal in a direction of the target UE 115. Using an RIS may improve a power and quality of a received signal at the UE 115 compared to transmitting through the obstacle. In some cases, different harmonic frequencies, or multiples of a base frequency of a reflected wave, may be introduced in the reflected wave, which may reduce a power of a target frequency signal at the UE 115. However, further implementations remain desired for implementing efficient use of harmonic frequencies in RIS deployment.

The wireless communications system 100 may support HDM for RISs as described herein. For example, an RIS may be deployed as part of a device, such as in a UE 115 or a network entity 105, and may be used to intentionally transmit on harmonic frequencies of a signal. For example, the RIS of the device may be periodically reconfigured according to a periodic coding sequence to modulate an reflection of an incident wave (e.g., from an RF source in the device) to transmit information as described with respect to FIG. 2. Notably, by periodically varying a configuration (i.e., reflection coefficients) of the RIS, different harmonic frequencies may be produced around a carrier frequency, where a phase and magnitude of the harmonic frequencies may be precisely controlled by carefully selecting a periodic configuration pattern for RIS (e.g., represented by a "digital coding sequence," or a "periodic coding sequence").

Figure 2:
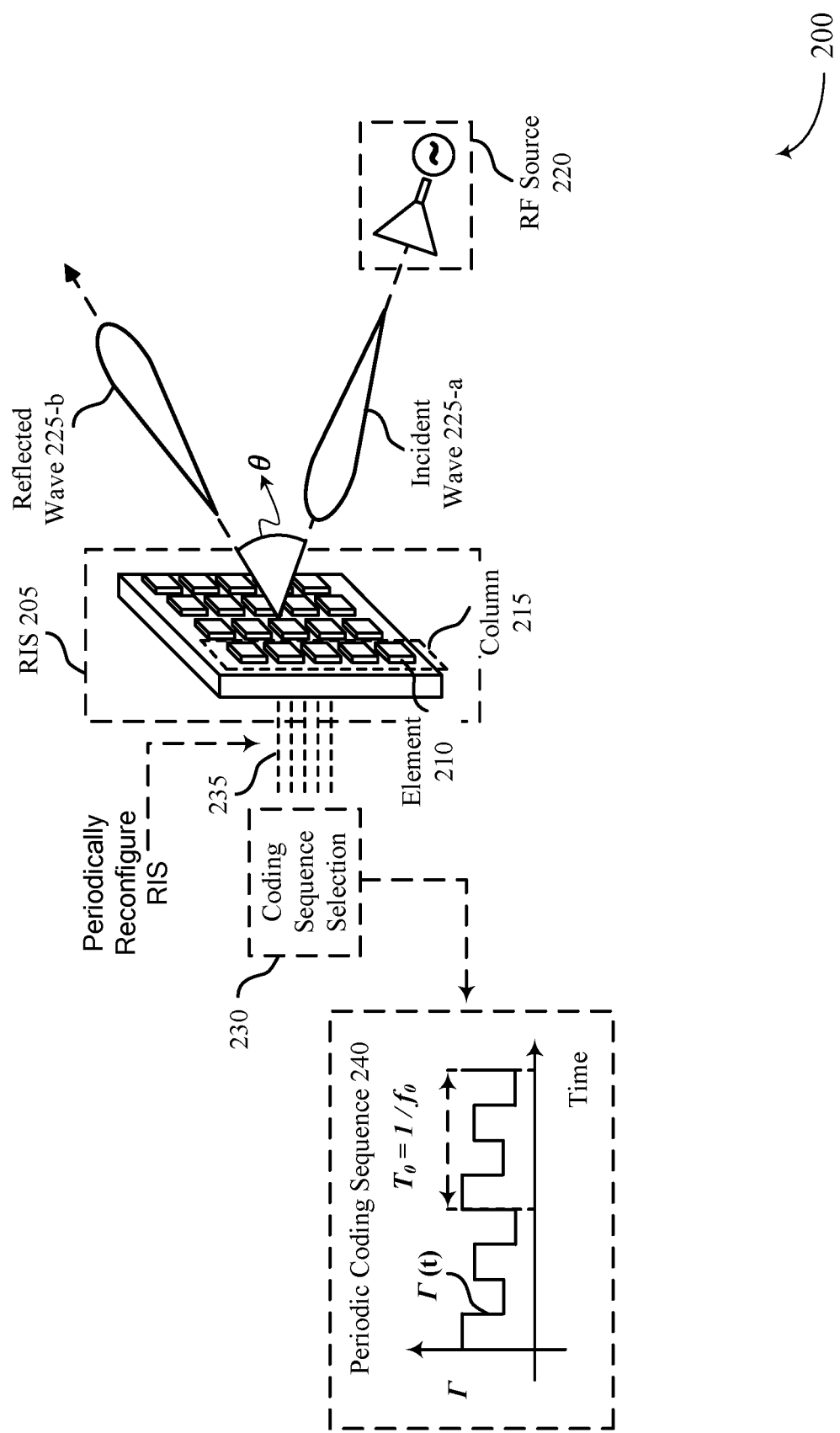
FIG. 2 shows an example of an RIS diagram that supports HDM for RISs in accordance with one or more aspects of the present disclosure.
Figure 3:
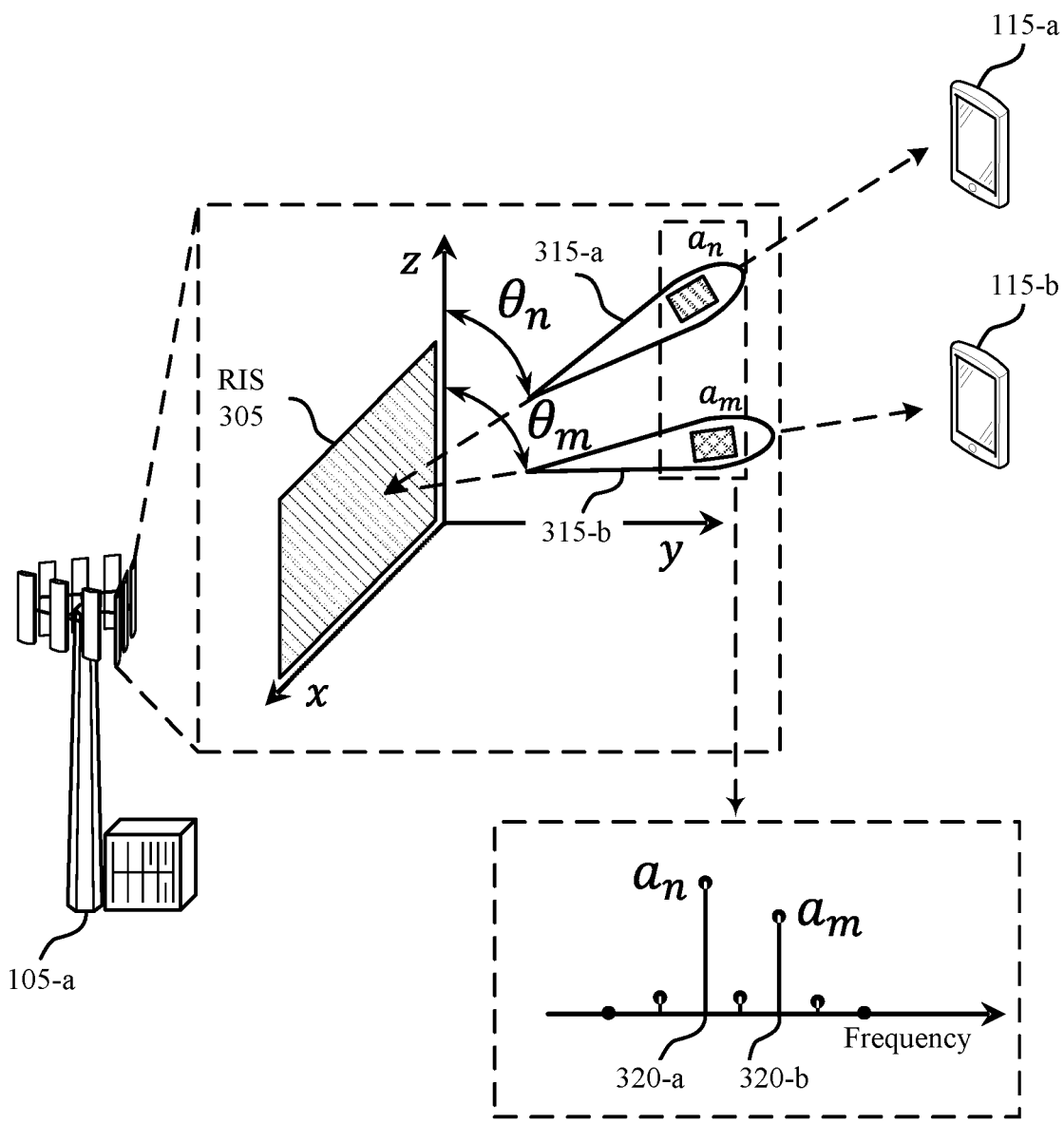
FIG. 3 shows an example of a signaling diagram that supports HDM for RISs in accordance with one or more aspects of the present disclosure.

HDM may thus be implemented to multiplex separate data streams using harmonic frequencies intentionally produced by configuring an RIS as described with respect to FIGS. 2 and 3. For example, a network entity 105 may utilize HDM transmit to multiple UEs 115 using different harmonic frequencies, or a UE 115 may utilize HDM to transmit to multiple network entities 105, or to transmit to multiple UEs 115 in sidelink (e.g., using a D2D communication link 135). Using HDM may improve a spectral efficiency at a low deployment cost, hardware complexity, and power consumption, due to an overall architecture for transmission relying on efficient RIS structures. Further, HDM may present an alternative implementation of backscattering communication via RIS as the incident signal illuminating an RIS aperture may be modulated using a low-cost RIS to serve multiple different devices in different directions as described with respect to FIGS. 2-4.

FIG. 2 shows an example of an RIS diagram 200 that supports HDM for RISs in accordance with one or more aspects of the present disclosure. The RIS diagram 200 may illustrate examples for implementing one or more aspects of the wireless communications system 100. For example, the RIS diagram 200 may illustrate processes for transmitting signals using an RIS 205, which may be implemented independently (e.g., as part of a roadside unit or other device for reflecting a signal around a barrier), or implemented within any one of a network entity 105, base station 140, RU 170, UE 115, or other device as described with respect to FIG. 1. In some examples, the RIS diagram 200 may support techniques for performing HDM using RISs as described herein.

For example, the RIS 205 may be deployed as part of a transmitting device instead of being deployed in a stand-alone fashion anywhere in a network for reflection purposes as described with respect to FIG. 1, where a transmitting device may be a UE 115 in uplink or sidelink, or in a network entity 105 in downlink. The RIS 205 may be an example of an array of passive and reconfigurable reflecting elements as described with respect to FIG. 1, including multiple elements 210 arranged in one or more columns 215 (and one or more rows) in an array. An internal RF source 220 of the device may illuminate the RIS 205 with an incident wave 225-a, which may be a self-generated unmodulated carrier wave at a carrier frequency/frequency range. The incident wave 225-a may be an example of a directional beam (e.g., electromagnetic wave) created using beamforming as described with respect to FIG. 1. The RIS 205 may reflect the incident wave 225-a to produce a reflected wave 225-b (e.g., modulated signal with modulated signal characteristics) for transmission to a receiving or target device in a direction based on a reflected angle θ. For example, the reflected wave 225-b may carry a modulated signal at a target harmonic frequency in a spectrum of harmonic frequency reflections. Each harmonic frequency reflection may carry a complex modulated symbol (e.g., including real and imaginary parts) corresponding to a harmonic order of a base frequency in relation to a carrier frequency of the incident wave 225-a.

To generate target signal characteristics at the reflected wave 225-b (e.g., harmonic frequencies and complex symbols of information), one or more parameters of the columns of the RIS 305 may be set (e.g., reconfigured) periodically using an appropriate periodic coding sequence as described herein. At 230, the transmitting device may select a periodic coding sequence to set one or more parameters of the elements 210 of the RIS 205 using signaling 235. For example, the transmitting device may select a periodic coding sequence 240 corresponding to a periodic reflection function Γ(t), which may represent a reflection coefficient Γ as it changes in the time domain. At 235 the device may set one or more elements 210 of the RIS 205 to represent the reflection coefficient Γ. The periodic coding sequence 240 (and subsequently of Γ(t)) may include a period of $T_0 = 1/f_0$, where $f_0$ may be a base frequency either selected or stored at a transmitting device.

Based on the periodic configuration, the RIS 205 may be used to transmit using different harmonic frequencies (e.g., harmonics) corresponding to reflection of the incident wave 225-a. For example, $E_i(t)$ and $E_r(t)$ may represent the incident wave 225-a and the reflected wave 225-b, respectively. Mathematically, Γ(t) of the periodic coding sequence 240 may represent a periodic reflection function applied to $E_i(t)$ to produce $E_r(t)$, as shown in Equation 1 below:

$$E_r(t) = \Gamma(t) \, E_i(t) \qquad (1)$$

Further, as Γ(t) is periodic (e.g., defined by period $T_0$), Γ(t) may be represented by a Fourier Series as defined in Equation 2 below:

$$\Gamma(t) = \sum_{n=-\infty}^{\infty} a_n \, \exp(j2\pi n f_0 t) \qquad (2)$$

Combining Equations 1 and 2, Equation 3 may be constructed:

$$E_r(f) = \Gamma(f) * E_i(f) = \left[ \sum_{n=-\infty}^{\infty} a_n \delta(f + n f_0) \right] * E_i(f) = \sum_{n=-\infty}^{\infty} a_n \, E_i(f + n f_0) \qquad (3)$$

$E_r(f)$ may represent the frequency spectrum of the reflected wave 225-b, where Γ(f) may be represented by the Fourier Series $\Sigma n_{-\infty}^{\infty} a_n \delta(f+nf_0)$. $a_n$ may represent a reflection coefficient for Γ(f), or otherwise a Fourier Series coefficient, at an n-th harmonic frequency of the base frequency $f_0$. Thus, for the incident wave 225-a, a reflected wave 225-b may be produced for one or more harmonics orders n as defined by Equations 1-3. For example, the incident wave 225-a may be represented by an example function of $\cos(2\pi f_c t)$, where $f_c$ may represent an initial carrier frequency. Based on modulation of the incident wave 225-a with the corresponding example function at the RIS 205, the reflected wave 225-b may be represented by an example function $A_n \cos(2\pi(f_c + nf_0)t + \theta_n)$, which may be a modulated signal produced by at an n-th harmonic frequency. $A_n$ may be related to $a_n$ according to $a_n = A_n e^{j\theta_n}$.

In some examples, a reflected wave 225-b may be steered via periodic reconfiguration in a direction of a target device (e.g., a receiving UE 115 or network entity 105). For example, any beam associated with a harmonic frequency may be steered via periodic reconfiguration by introducing appropriate phase difference between adjacent sets of RIS elements 210 that can be controlled independently, such as the columns 215 of the RIS 205.

In a representative example, to implement a uniform linear array (ULA) to steer the reflected wave 225-b corresponding to a harmonic frequency in a horizontal (e.g., azimuth) plane with respect to the incident wave 225-a, a time-delayed version of a same coding sequence may be used for each set of adjacent RIS columns as shown in Equations 4-6 below:

$$\Gamma_1(t) = \Gamma(t) \overset{FS}{\leftrightarrow} a_n \qquad (4)$$

$$\Gamma_2(t) = \Gamma(t - t_d) \overset{FS}{\leftrightarrow} a_n \exp(-j2\pi n f_0 t_d) \qquad (5)$$

$$\dots$$

$$\Gamma_N(t) = \Gamma(t - (N-1)t_d) \overset{FS}{\leftrightarrow} a_n ex \, p(-j2\pi mn(N-1)t_d) \qquad (6)$$

Equations 4-6 may represent respective reflection coefficients of the columns 215 of the RIS 205, including $\Gamma_1(t)$, $\Gamma_2(t)$, through $\Gamma_N(t)$ for N reflection coefficients corresponding to N columns 215 of the RIS 205. In the example of a ULA, $a_n$ may be adjusted to set values of $A_n$ and $\theta_n$ of the example function described herein of the reflected wave 225-b, where $t_d$ may be adjusted to steer a direction of the beam.

In some examples, a phase difference $\Delta\psi_c$ between adjacent columns 415 of the RIS 205 may be represented by $\Delta\psi_c=2\pi n f_0 t_d$, where n may represent a corresponding harmonic order, $f_0$ may represent a base frequency of the harmonic frequencies, and $t_d$ may represent a time delay applied between adjacent columns (e.g., to delay $\Gamma(t)$). Additionally, or alternatively, a phase difference $\Delta\psi_e$ between ULA elements of a ULA may be represented by $\Delta\psi_e=2\pi(d/\lambda)\sin(\theta)$, where d may be a distance between ULA elements, and $\lambda$ may be a wavelength of a base frequency, and $\theta$ may be an angel between an incident and reflected wave. In the example of setting reflection coefficients of columns 215 of the RIS 205 to implement a ULA, the phase equations may be set equal so $\Delta\psi_c=\Delta\psi_e$, where an angle $\theta$ of the reflected wave 225-b with respect to the azimuth plane may be found by Equation 7 below:

$$\theta = \sin^{-1}\left((\lambda/d)n f_0 t_d\right) \qquad (7)$$

Thus, a time delay $t_d$ for a periodic coding sequence may be applied (e.g., to shift the periodic coding sequence 240 in the time domain) to introduce a phase shift between each column 215 of elements 210 (e.g., from left to right), which may alter $\theta$ and therefore a direction of the different harmonic frequency reflections of the incident wave 225-a. By applying a time delay to the RIS 205, reflected beams may be directed to multiple target devices as described with respect to FIG. 3. Further, the angle of reflection $\theta$ may be changed by selecting a different base frequency $f_0$ as described with respect to FIG. 3. In some examples, a time delay may be applied by applying individual time delays to each individual element 210 for steering a direction of a reflected harmonic wave 225-b in other planes and directions.

FIG. 3 shows an example of a signaling diagram 300 that supports HDM for RISs in accordance with one or more aspects of the present disclosure. The signaling diagram 300 may illustrate examples for implementing one or more aspects of the wireless communications system 100 and the RIS diagram 200. For example, the signaling diagram 300 may represent signaling between a network entity 105-a and UEs 115-a and 115-b using an RIS 305, which may represent a network entity 105, UEs 115, and an RIS 205 as described with respect to FIGS. 1 and 2. In some examples, the RIS 305 may be deployed at a transmitter including an internal RF source, such as the network entity 105, the UE 115-a, or the UE 115-b, for transmitting reflected harmonic frequency waves in downlink (e.g., network entity to UE), uplink (e.g., UE to network entity), or sidelink (e.g., UE to UE). In some examples, the signaling diagram 300 may illustrate techniques for performing HDM using RISs as described herein.

In a representative example, to improve spectral efficiency of communications, the network entity 105-a may manipulate the RIS 305 using periodic configuration patterns to generate desired complex symbols for a first and second data stream to be sent using different harmonic frequencies. For example, the network entity 105-a (e.g., a gNB) may serve both the UE 115-a and the UE 115-b in downlink, where the UEs 115 may be located at different directions. The network entity 105-a may use a different harmonic frequency for each UE 115, where each harmonic frequency may be associated with a distinct beam pointing in a direction of a corresponding UE 115.

For example, the network entity 105-a may perform HDM by transmitting to both UEs 115 in different harmonic orders of a base frequency $f_0$ in relation to a carrier frequency $f_c$. The network entity 105-a may select a periodic coding sequence and the harmonic orders n and m based on directions $\theta_n$ and $\theta_m$ of the UEs 115-a and 115-b. By reflecting an incident wave off the RIS 305, the network entity 105-a may modulate and transmit a first signal 310-a to the UE 115-a using a beam 315-a and a second signal 310-b to the UE 115-b using a beam 315-b at corresponding harmonic frequencies 320-a and 320-b represented by $f_c+nf_0$ and $f_c+mf_0$, respectively. Additionally, or alternatively, the network entity 105-a may select the harmonic orders n and m of the base frequency $f_0$ for transmitting to any UEs 115 in the corresponding directions, where the UEs 115-a and 115-b may receive the first and second signals 310 based on the selected directions and harmonic orders. In some cases, for a linear phase gradient, a direction of the first signal 310-a may be based on an angle $\theta_n=\sin^{-1}((\lambda/d)nf_0 t_d)$. Similarly, a direction of the second signal 310-b may be defined by $\theta_m=\sin^{(-1)}((\lambda/d)mf_0 t_d)$.

In some examples, the network entity 105-a may generate complex symbols $a_n$ (to sent to the UE 115-a) and $a_m$ (to sent to the UE 115-b) at the harmonic frequencies $f_c+nf_0$ and $f_c+mf_0$, respectively, using the RIS 305 (e.g., the harmonic frequencies $f_c+nf_0$ and $f_c+mf_0$ may correspond to the complex symbols $a_n$ and $a_m$, and thus may correspond to the selected periodic coding sequence). For example, the first signal 310-a may include the symbol $a_n$, and the second signal 310-b may include the symbol $a_m$. After receiving the signals, UEs 115 may decode the signals based on corresponding harmonic frequencies and the base frequency $f_0$ to determine one or more bits of information. In some examples, the UE 115-a and the UE 115-b may be in a same direction, where m=n and $\theta_n=\theta_m$.

In some examples, a periodic configuration pattern $\Gamma(t)$ corresponding to a periodic coding sequence may be designed or selected at the network entity 105-a (or stored) to generate $a_n$ and $a_m$ according to Equations 8 and 9 below:

$$a_n = \frac{1}{T_0}\int_0^{T_0} \Gamma(t)e^{-j2\pi n f_0 t}dt \qquad (8)$$

$$a_m = \frac{1}{T_0}\int_0^{T_0} \Gamma(t)e^{-j2\pi n f_0 t}dt \qquad (9)$$

In some examples, the RIS 305 associated with (e.g., an integral part of) the network entity 105-a may be reconfigured periodically using an appropriate coding sequence (or a set of different coding sequences) to generate and steer the complex symbols. For example, at a first time, the network entity 105-a may transfer a first data stream (e.g., in the signal 310-a) to the UE 115-a by configuring the RIS 305 with a periodic coding sequence corresponding to $a_n$, where $a_n$ may be generated in reflection at the RIS 305 and may be represented by Equation 8. The network entity 105-a may, at a next time, reconfigure the RIS 305 according to a different periodic coding sequence to generate the complex symbol $a_m$ according to Equation 9 for transmission to the UE 115-b. In some examples, the network entity 105-a may reconfigured the RIS 305 according to a period for reconfiguration. In some examples, the network entity 105-a may multiplex both symbols by utilizing a same carrier frequency $f_c$ (e.g., a same incident wave from a same source), a same base frequency $f_0$, and a same RIS 305.

Additionally, or alternatively, the network entity 105-*a* may multiplex the signals by performing a multicast operation of a single data transmission (e.g., a same set of information bits) using the different harmonic orders n and m. For example, the network entity 105-*a* may configure the RIS 305 with a same periodic coding sequence corresponding to a string of bits of information for transmitting the signals 310-*a* and 310-*b* including the symbols $a_n$ and $a_m$ at a same time to the UE 115-*a* and 115-*b*. That is, the symbols $a_n$ and $a_m$ may each represent a same message and may be transmitted over different harmonic frequencies reflected at the RIS 305 from a same incident wave. Additionally, or alternatively, the network entity 105-*a* may transmit the signals based on a same coding sequence at different times using the same incident wave. In some examples, the network entity 105-*a* may reconfigure the RIS 305 (e.g., at a later time) with a different periodic coding sequence for transmission of additional symbols a (e.g., representing new information) to the UEs 115-*a* and 115-*b*, or to additional UEs 115.

In some examples, in order to steer the beams 315-*a* and 315-*b* for $a_n$ and $a_m$ towards directions $\theta_n$ and $\theta_m$, respectively, an additional phase shift may be introduced along with $\Gamma(t)$ to each group of independently-controllable adjacent RIS elements (e.g., columns) as described with respect to FIG. 2. For example, a target phase shift may be obtained by applying a time delay $t_d$ to $\Gamma(t)$ between each group (e.g., column) of adjacent RIS elements.

In some cases, the network entity 105-*a* may select a periodic configuration $\Gamma(t)$ and a time delay (e.g., time shift of $\Gamma(t)$ across RIS elements) $t_d$ for transmitting the signals 310. For example, $\Gamma(t)$ may be designed as a discrete-valued function by L reflection coefficients, i.e., $\Gamma_0, \ldots, \Gamma_{L-1}$, where L may depend on a capability of the RIS 305. For example, the L reflection coefficients may be based on a quantity of different reflection coefficients that the RIS 305 may generate, which may be based on a quantity of rows, columns, or elements of the RIS 305. In some cases, $\Gamma(t)$ may be represented by Equation 10 below accordingly:

$$\Gamma(t) = \sum_{\ell=0}^{L-1} \Gamma_\ell g(t - \ell T_0/L) \quad (10)$$

g(t) may be an example of a unit-norm pulse with a width of $T_0/L$, for which $a_n$ and $a_m$ may be expressed jointly according to Equation 11:

$$a_k = \frac{1}{L}\mathrm{sinc}\left(\frac{k\pi}{L}\right)\exp\left(-j\frac{k\pi}{L}\right) \times \sum_{\ell=0}^{L-1} \Gamma_k \exp\left(-j\frac{2\pi k\ell}{L}\right) \quad (11)$$

In some examples, $t_d$ may be designed based on linear-gradient-based scanning, for which $\theta_n$ and $\theta_m$ may be expressed jointly according to Equation 12:

$$\theta_\ell = \sin^{-1}\left((\lambda/d)\ell f_0 t_d\right) \quad (12)$$

In some cases, the choice of $f_0 t_d$ may determine an angle resolution of $\theta_\ell$, where $\lambda$ and d may be fixed. For example, to achieve increased resolution (e.g., above a threshold), a larger $f_0$ may be paired with a smaller $t_d$, where $t_d$ may be limited by a minimum switching speed for a tuning element (e.g., an element of the RIS 305). Additionally, or alternatively, smaller $f_0$ values may be paired with larger $t_d$ values. In some cases, interference between receiving devices (e.g., the UEs 115-*a* and 115-*b*) may increase as $f_0$ decreases due to smaller frequency separation between the signals 310. Thus, the network entity 105-*a* may select $f_0$ and $t_d$ (or $f_0$ and $t_d$ values may be stored in one or more configurations) to achieve a maximum frequency separation while remaining above a minimum switching speed of tuning elements of the RIS 305. Additionally, or alternatively, $f_0$ and $t_d$ may be selected to favor either switching speed or frequency separation accordingly.

In some examples, power conversion efficiency may decrease as the harmonic order increases. Thus, in some examples, the network entity 105-*a* may select (or be configured with) minimum harmonic orders for m and n to achieve the desired directions while maximizing a power of the signals 310-*a* and 310-*b*.

In some examples, HDM as employed by the signaling diagram 300 may present advantages compared to RIS standalone deployment and other techniques for signal transmission. For example, by generating complex symbols by manipulating how an electromagnetic wave (e.g., the waves 315) is reflected off the RIS 305, the network entity 105-*a* (or a UE 115 including an RIS) may omit one or more components, including digital to analog (D/A) converters and RF chains (e.g., mixers, filters). As a result, an architecture of the network entity 105-*a* may have a decreased cost, decreased hardware complexity, and decreased power consumption compared to structures with one or multiple RF chains. Further, by multiplexing different data streams, the network entity 105-*a* may conserve resources. For example, the network entity 105-*a* may conserve frequency resources by transmitting the symbol $a_n$ to the UE 115-*a* and the $a_m$ to the UE 115-*b* using a same RIS, a same carrier frequency, a same base frequency, and a same incident wave source. Further, the network entity may conserve both frequency and time resources by performing a multicast operation to transmit the symbol $a_n$ to the UE 115-*a* and the $a_m$ to the UE 115-*b* using a same set of time resources alongside a same RIS, carrier frequency, base frequency, and incident wave source. Additionally, or alternatively, utilizing a time delay $t_d$ may allow adjustment of both a direction of a transmission and a resolution of the direction by adjusting $t_d$.

Figure 4:
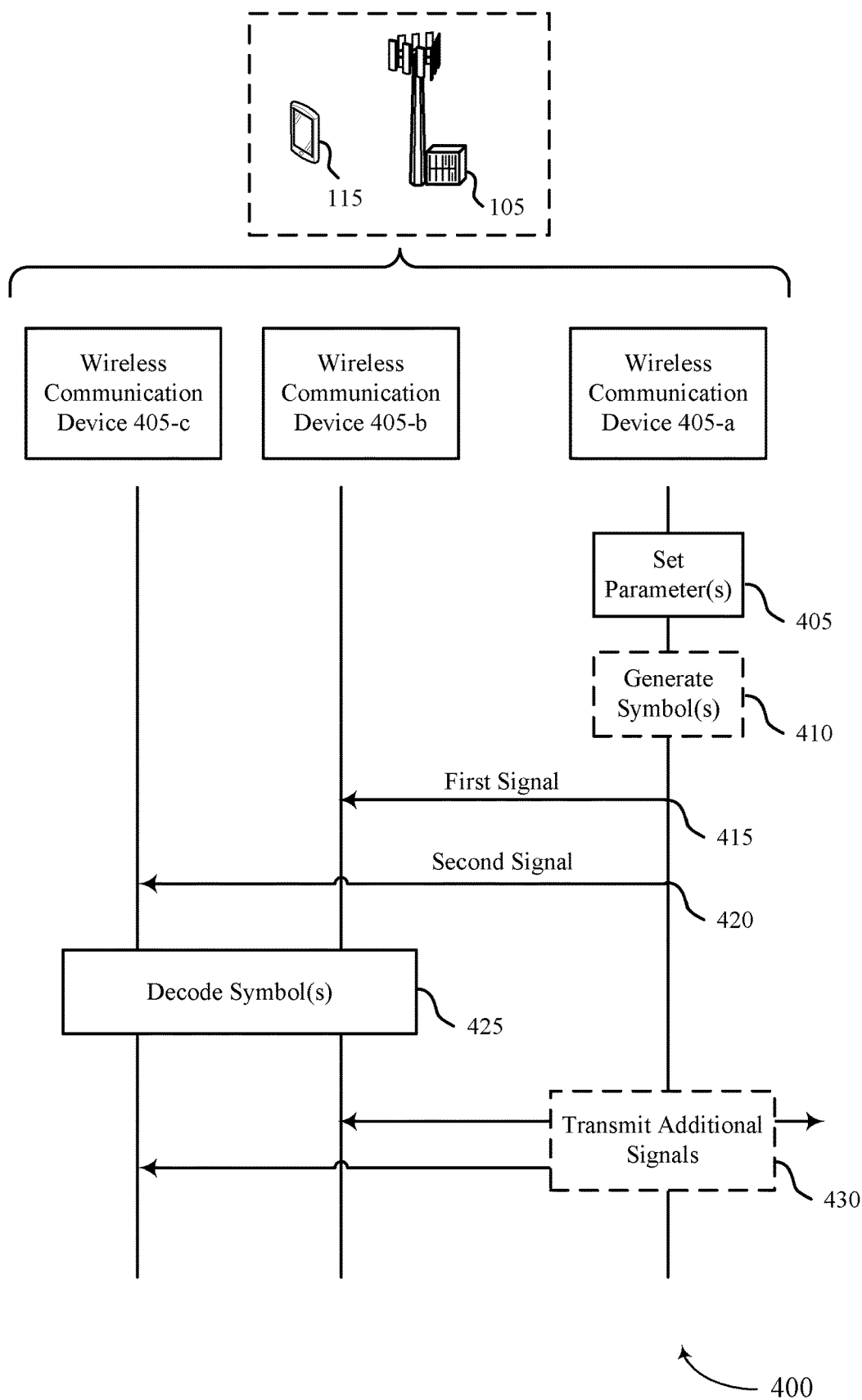
FIG. 4 shows an example of a process flow that supports HDM for RISs in accordance with one or more aspects of the present disclosure.

FIG. 4 shows an example of a process flow 400 that supports HDM for RISs in accordance with one or more aspects of the present disclosure. The process flow 400 may illustrate examples for implementing one or more aspects of the wireless communications system 100, the RIS diagram 200, and the signaling diagram 300. For example, the process flow may illustrate methods including signaling and processes performed at a wireless communication device 405-*a*, a wireless communication device 405-*b*, and a wireless communication device 405-*c*, which may each represent a UE 115 or a network entity 105 (or another device) as described with respect to FIGS. 1-3. In some cases, the process flow 400 may support techniques for performing HDM using RISs as described herein.

At 405, the wireless communication device 405-*a* (e.g., a first wireless communication device) may set one or more parameters corresponding to one or more columns of an RIS based on a periodic coding sequence. For example, the wireless communication device 405-*a* may configure a reflection coefficient of one or more columns of an RIS according to a periodic reflection function of a corresponding periodic coding sequence as described with respect to FIGS. 1-3. In some examples, the wireless communication device 405-a may include the RIS.

At 410, the wireless communication device 405-a may optionally generate a first symbol, a second symbol, or both, for transmission in one or more signals. For example, the wireless communication device 405-a may generate, at the RIS based on the one or more parameters, a first symbol including one or more bits corresponding to the periodic coding sequence. The wireless communication device 405-a may also generate, at the RIS based on the one or more parameters, a second symbol including the one or more bits corresponding to the periodic coding sequence. In some examples, the first symbol may be based on a first harmonic frequency and a base frequency, and the second symbol may be based on a second harmonic frequency and the base frequency. For example, the first harmonic frequency may correspond to a first order of the base frequency and the second harmonic frequency may corresponds to a second order of the base frequency different from the first order.

At 415, the wireless communication device 405-a may transmit, and the wireless communication device 405-b (e.g., a second wireless communication device) may receive, a first signal using the first harmonic frequency based on the one or more parameters. In some examples, transmitting the first signal using the first harmonic frequency may include transmitting the first signal in a first direction associated with the wireless communication device 405-b based on the one or more parameters. In some examples, the first direction may be based on a first phase shift corresponding to a first time delay applied to the periodic coding sequence as described with respect to FIGS. 2 and 3. Additionally, or alternatively, the first direction may be based on the first harmonic frequency and a base frequency. In some cases, the first symbol may be transmitted in the first signal. Additionally, or alternatively, the first signal may be transmitted using (and thereby received from) the RIS.

At 420, the wireless communication device 405-a may transmit, and the wireless communication device 405-c (e.g., a third wireless communication device) may receive, a second signal using the second harmonic frequency different from the first harmonic frequency based on the one or more parameters. In some examples, and transmitting the second signal using the second harmonic frequency may include transmitting the second signal in a second direction different from the first direction and associated with the wireless communication device 405-c based on the one or more parameters. In some examples, the second direction may be based on a second phase shift corresponding to a second time delay applied to the periodic coding sequence. Additionally, or alternatively, the second direction may be based on the second harmonic frequency and the base frequency. In some examples, the second symbol may be transmitted in the second signal. The second signal may also transmitted using (and thereby received from) the RIS.

At 425, the wireless communication device 405-b and the wireless communication device 405-a may decode the first signal and the second signal, respectively, based on the periodic coding sequence, as well as based on the first harmonic frequency and the second harmonic frequency, respectively. For example, the wireless communication device 405-b may determine the first symbol including the one or more bits received in the first signal and corresponding to the periodic coding sequence based on decoding the first signal. Similarly, the wireless communication device 405-c may determine the second symbol based on decoding the second signal.

In some examples, the wireless communication device 405-b may refrain from receiving the second signal from the wireless communication device 405-a using the second harmonic frequency different from the first harmonic frequency. The may be based on the second signal being associated with the second harmonic frequency.

At 430, the wireless communication device 405-a may optionally transmit one or more additional signals to various devices. For example, the wireless communication device 405-a may set one or more second parameters corresponding to the one or more columns of the RIS based on a second periodic coding sequence different from the periodic coding sequence. The wireless communication device 405-a may transmit a third signal to an additional wireless communication device 405 (e.g., a fourth wireless communication device) using a third harmonic frequency based on the one or more second parameters, and may transmit a fourth signal to another additional wireless communication device 405 (e.g., a fifth wireless communication device) using a fourth harmonic frequency different from the third harmonic frequency based on the one or more second parameters. In some examples, the third harmonic frequency may be different from the first harmonic frequency, and the fourth harmonic frequency may be different from the second harmonic frequency.

Additionally, or alternatively, the wireless communication device 405-a may transmit, and the wireless communication device 405-b, the wireless communication device 405-c, or both, may receive. an additional signal based on a second periodic coding sequence different from the first periodic coding sequence and associated with the RIS. For example, the wireless communication device 405-b may receive an additional signal using an additional harmonic frequency different from the first harmonic frequency, and the wireless communication device 405-c may receive an additional signal using an additional harmonic frequency different from the second harmonic frequency. The wireless communication devices 405-b and 405-c may subsequently decode the additional signals based on the second periodic coding sequence and respective additional harmonic frequencies with which the additional signals are received. In some cases, the additional harmonic frequencies may be the same as the third harmonic frequency and the fourth harmonic frequency, respectively, used to transmit to the additional wireless communication devices 405.

Figure 5:
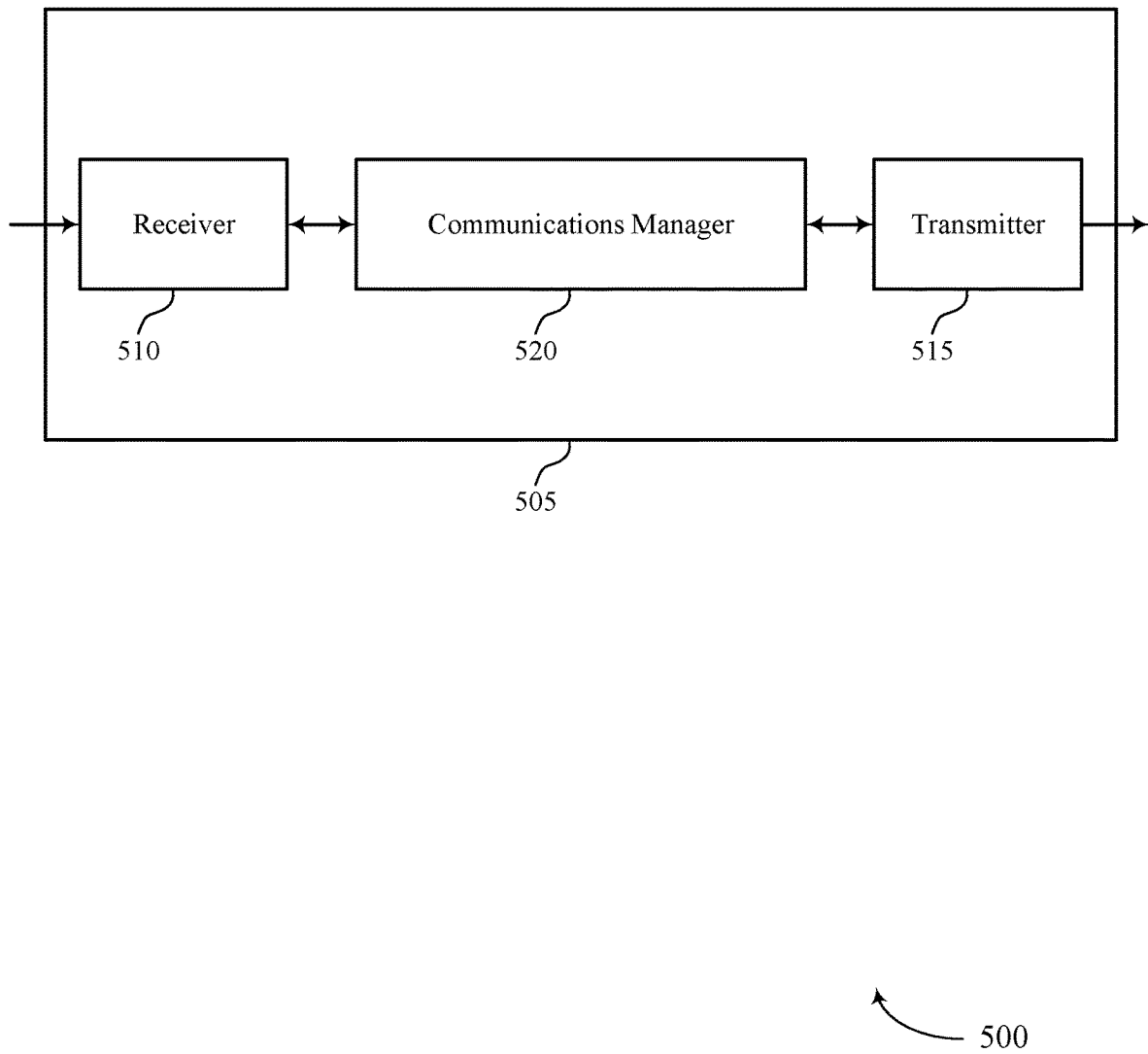
FIGS. 5 and 6 show block diagrams of devices that support HDM for RISs in accordance with one or more aspects of the present disclosure.

FIG. 5 shows a block diagram 500 of a device 505 that supports HDM for RISs in accordance with one or more aspects of the present disclosure. The device 505 may be an example of aspects of a UE 115 or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include one or more processors, which may be coupled with one or more memories storing processor-executable code, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to HDM for RISs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to HDM for RISs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of HDM for RISs as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include one or more of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing processor-executable instructions stored in the one or more memories).

Additionally, or alternatively, the communications manager 520, the receiver 510, the transmitter 515, or various combinations or components thereof may be implemented in processor-executable code (e.g., as communications management software or firmware) executed by one or more processors. If implemented in code executed by the one or more processors, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first wireless communication device in accordance with examples as disclosed herein. For example, the communications manager 520 is capable of, configured to, or operable to support a means for setting one or more parameters corresponding to one or more columns of an RIS based on a periodic coding sequence. The communications manager 520 is capable of, configured to, or operable to support a means for transmitting a first signal to a second wireless communication device using a first harmonic frequency based on the one or more parameters. The communications manager 520 is capable of, configured to, or operable to support a means for transmitting a second signal to a third wireless communication device using a second harmonic frequency different from the first harmonic frequency based on the one or more parameters.

Additionally, or alternatively, the communications manager 520 may support wireless communications at a second wireless communication device in accordance with examples as disclosed herein. For example, the communications manager 520 is capable of, configured to, or operable to support a means for receiving a signal from a first wireless communication device using a harmonic frequency, where the signal is based on a periodic coding sequence and is associated with an RIS. The communications manager 520 is capable of, configured to, or operable to support a means for decoding the signal based on the periodic coding sequence and the harmonic frequency.

By including or configuring the communications manager 520 in accordance with examples as described herein, the device 505 (e.g., one or more processors controlling or otherwise coupled with the receiver 510, the transmitter 515, the communications manager 520, or a combination thereof) may support techniques for reduced power consumption, reduced processing, and more efficient utilization of communication resources by multiplexing signals using an RIS in a non-standalone implementation (e.g., at the device 505 or a transmitting device).

Figure 6:
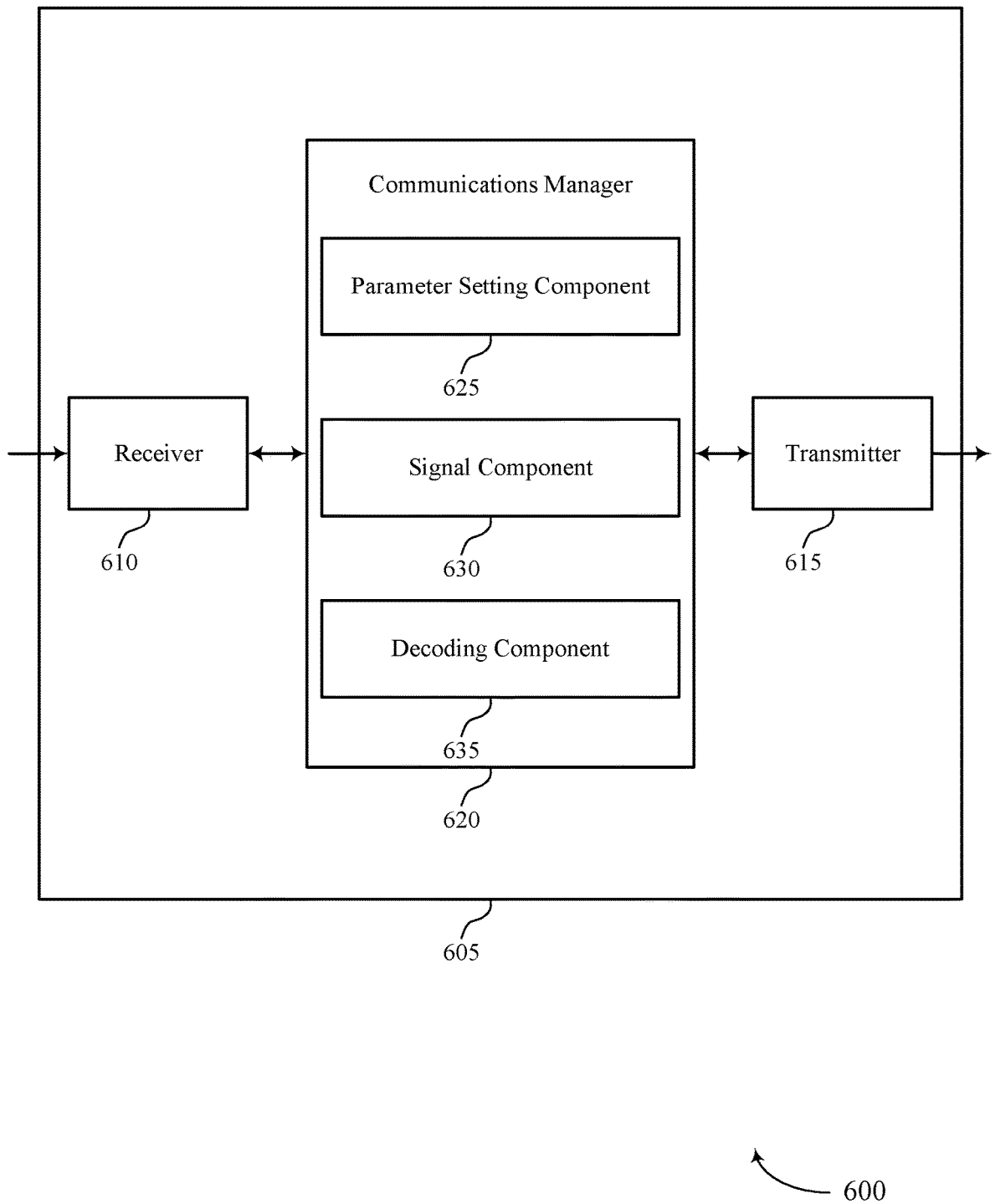

FIG. 6 shows a block diagram 600 of a device 605 that supports HDM for RISs in accordance with one or more aspects of the present disclosure. The device 605 may be an example of aspects of a device 505, a UE 115, or a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include one or more processors, which may be coupled with one or more memories storing processor-executable code, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to HDM for RISs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to HDM for RISs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of HDM for RISs as described herein. For example, the communications manager 620 may include a parameter setting component 625, a signal component 630, a decoding component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless communication device in accordance with examples as disclosed herein. The parameter setting component 625 is capable of, configured to, or operable to support a means for setting one or more parameters corresponding to one or more columns of an RIS based on a periodic coding sequence. The signal component 630 is capable of, configured to, or operable to support a means for transmitting a first signal to a second wireless communication device using a first harmonic frequency based on the one or more parameters. The signal component 630 is capable of, configured to, or operable to support a means for transmitting a second signal to a third wireless communication device using a second harmonic frequency different from the first harmonic frequency based on the one or more parameters.

Additionally, or alternatively, the communications manager 620 may support wireless communications at a second wireless communication device in accordance with examples as disclosed herein. The signal component 630 is capable of, configured to, or operable to support a means for receiving a signal from a first wireless communication device using a harmonic frequency, where the signal is based on a periodic coding sequence and is associated with an RIS. The decoding component 635 is capable of, configured to, or operable to support a means for decoding the signal based on the periodic coding sequence and the harmonic frequency.

Figure 7:
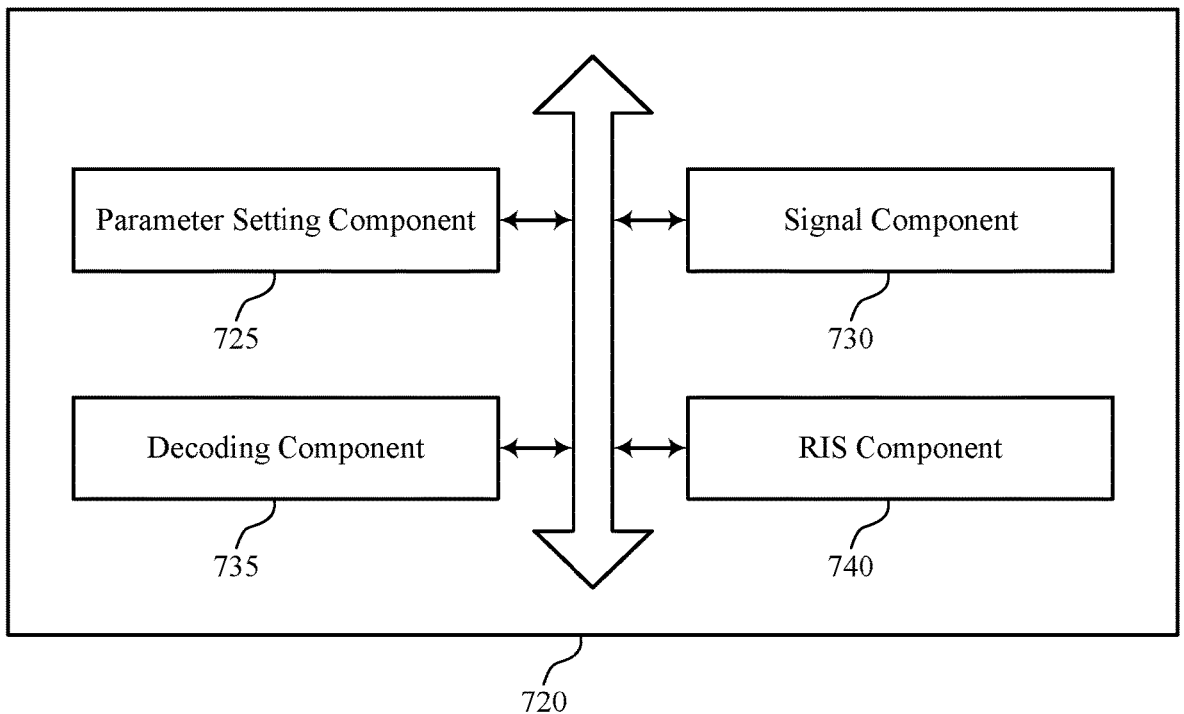
FIG. 7 shows a block diagram of a communications manager that supports HDM for RISs in accordance with one or more aspects of the present disclosure.

FIG. 7 shows a block diagram 700 of a communications manager 720 that supports HDM for RISs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of HDM for RISs as described herein. For example, the communications manager 720 may include a parameter setting component 725, a signal component 730, a decoding component 735, a RIS component 740, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a first wireless communication device in accordance with examples as disclosed herein. The parameter setting component 725 is capable of, configured to, or operable to support a means for setting one or more parameters corresponding to one or more columns of an RIS based on a periodic coding sequence. The signal component 730 is capable of, configured to, or operable to support a means for transmitting a first signal to a second wireless communication device using a first harmonic frequency based on the one or more parameters. In some examples, the signal component 730 is capable of, configured to, or operable to support a means for transmitting a second signal to a third wireless communication device using a second harmonic frequency different from the first harmonic frequency based on the one or more parameters.

In some examples, to support transmitting the first signal using the first harmonic frequency and transmitting the second signal using the second harmonic frequency, the signal component 730 is capable of, configured to, or operable to support a means for transmitting the first signal in a first direction associated with the second wireless communication device based on the one or more parameters. In some examples, to support transmitting the first signal using the first harmonic frequency and transmitting the second signal using the second harmonic frequency, the signal component 730 is capable of, configured to, or operable to support a means for transmitting the second signal in a second direction different from the first direction and associated with the third wireless communication device based on the one or more parameters.

In some examples, the first direction is based on a first phase shift corresponding to a first time delay applied to the periodic coding sequence. In some examples, the second direction is based on a second phase shift corresponding to a second time delay applied to the periodic coding sequence.

In some examples, the first direction is based on the first harmonic frequency and a base frequency. In some examples, the second direction is based on the second harmonic frequency and the base frequency.

In some examples, the RIS component 740 is capable of, configured to, or operable to support a means for generating, at the RIS based on the one or more parameters, a first symbol including one or more bits corresponding to the periodic coding sequence, where the first symbol is transmitted in the first signal. In some examples, the RIS component 740 is capable of, configured to, or operable to support a means for generating, at the RIS based on the one or more parameters, a second symbol including the one or more bits corresponding to the periodic coding sequence, where the second symbol is transmitted in the second signal.

In some examples, the first symbol is based on the first harmonic frequency and a base frequency. In some examples, the second symbol is based on the second harmonic frequency and the base frequency.

In some examples, the parameter setting component 725 is capable of, configured to, or operable to support a means for setting one or more second parameters corresponding to the one or more columns of the RIS based on a second periodic coding sequence different from the periodic coding sequence. In some examples, the signal component 730 is capable of, configured to, or operable to support a means for transmitting a third signal to a fourth wireless communication device using a third harmonic frequency based on the one or more second parameters. In some examples, the signal component 730 is capable of, configured to, or operable to support a means for transmitting a fourth signal to a fifth wireless communication device using a fourth harmonic frequency different from the third harmonic frequency based on the one or more second parameters.

In some examples, the first harmonic frequency corresponds to a first order of a base frequency and the second harmonic frequency corresponds to a second order of the base frequency different from the first order. In some examples, the first wireless communication device includes a network entity. In some examples, the second wireless communication device includes a first UE. In some examples, the third wireless communication device includes a second UE. In some examples, the first wireless communication device includes a UE. In some examples, the second wireless communication device, the third wireless communication device, or both, include a network entity. In some examples, the first wireless communication device includes the RIS. In some examples, the first signal and the second signal are transmitted using the RIS.

Additionally, or alternatively, the communications manager 720 may support wireless communications at a second wireless communication device in accordance with examples as disclosed herein. In some examples, the signal component 730 is capable of, configured to, or operable to support a means for receiving a signal from a first wireless communication device using a harmonic frequency, where the signal is based on a periodic coding sequence and is associated with an RIS. The decoding component 735 is capable of, configured to, or operable to support a means for decoding the signal based on the periodic coding sequence and the harmonic frequency.

In some examples, the signal component 730 is capable of, configured to, or operable to support a means for refraining from receiving a second signal from the first wireless communication device using a second harmonic frequency different from the harmonic frequency, where the refraining is based on the second signal being associated with the second harmonic frequency. In some examples, the second signal is based on the periodic coding sequence and is associated with a third wireless communication device.

In some examples, to support receiving the signal using the harmonic frequency, the signal component 730 is capable of, configured to, or operable to support a means for receiving the signal in a first direction associated with the second wireless communication device, where the first direction is different from a second direction associated with a third wireless communication device.

In some examples, the first direction is associated with a first phase shift corresponding to a first time delay associated with the periodic coding sequence. In some examples, the second direction is associated with a second phase shift corresponding to a second time delay associated with the periodic coding sequence. In some examples, the first direction is based on the harmonic frequency and a base frequency. In some examples, the second direction is based on a second harmonic frequency, different from the harmonic frequency, and the base frequency.

In some examples, the decoding component 735 is capable of, configured to, or operable to support a means for determining a symbol including one or more bits received in the signal based on the decoding, where the symbol corresponds to the periodic coding sequence. In some examples, the symbol is based on the harmonic frequency and a base frequency and is different from a second symbol based on a second harmonic frequency, different from the harmonic frequency, and the base frequency.

In some examples, the signal component 730 is capable of, configured to, or operable to support a means for receiving a second signal from the first wireless communication device using a second harmonic frequency different from the harmonic frequency, where the second signal is based on a second periodic coding sequence different from the periodic coding sequence and is associated with the RIS. In some examples, the decoding component 735 is capable of, configured to, or operable to support a means for decoding the second signal based on the second periodic coding sequence and the second harmonic frequency.

In some examples, the harmonic frequency corresponds to a first order of a base frequency and different from a second order of the base frequency. In some examples, the first wireless communication device includes a network entity. In some examples, the second wireless communication device includes a UE. In some examples, the first wireless communication device includes a UE. In some examples, the second wireless communication device include a network entity. In some examples, the first wireless communication device includes the RIS. In some examples, the signal is received from the RIS.

Figure 8:
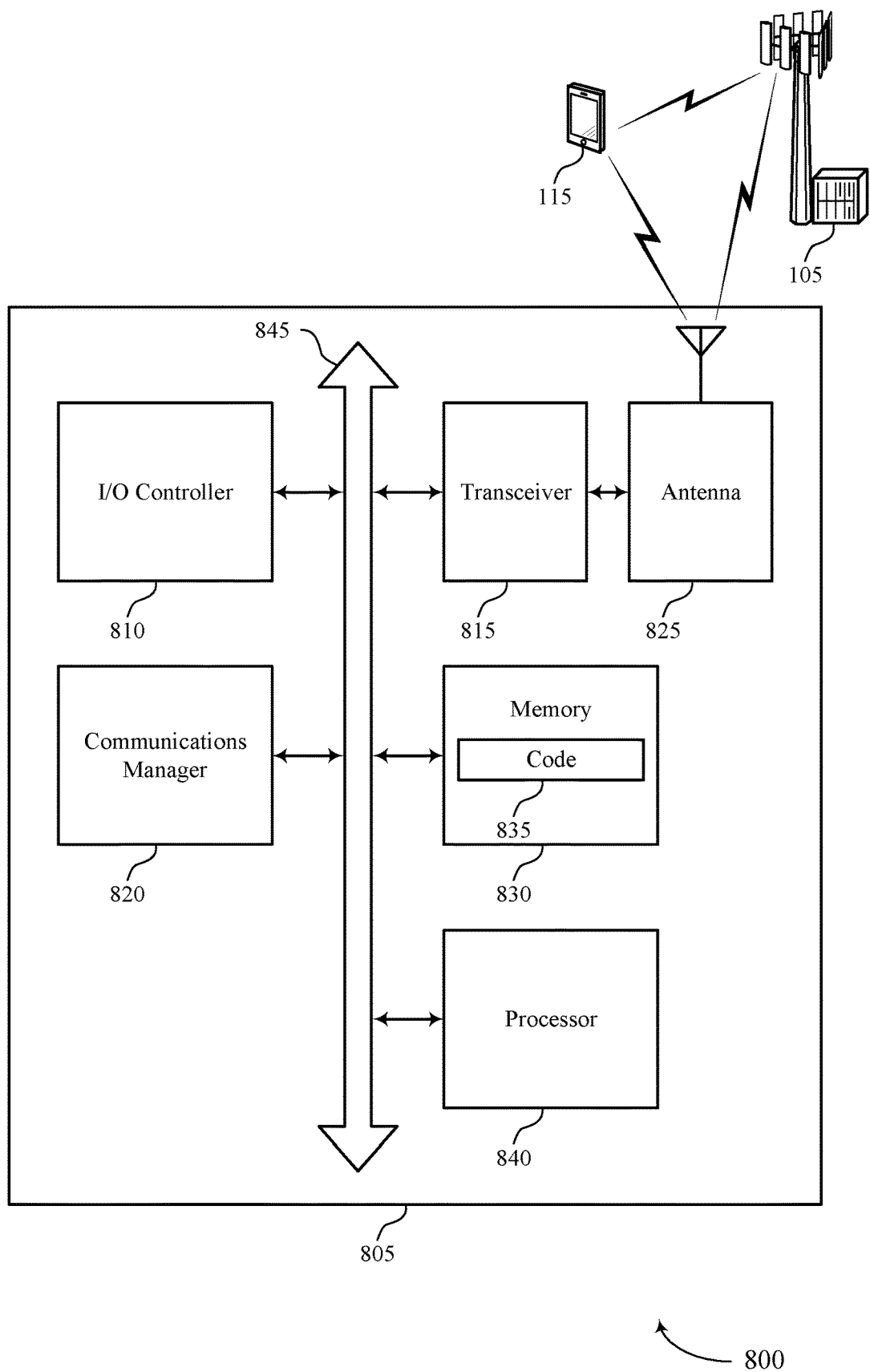
FIG. 8 shows a diagram of a system including a UE that supports HDM for RISs in accordance with one or more aspects of the present disclosure.

FIG. 8 shows a diagram of a system 800 including a device 805 that supports HDM for RISs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830 (e.g., one or more memories 830), code 835 (e.g., processor-executable code), and at least one processor 840 (e.g., one or more processors 840). These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting HDM for RISs). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications at a first wireless communication device in accordance with examples as disclosed herein. For example, the communications manager 820 is capable of, configured to, or operable to support a means for setting one or more parameters corresponding to one or more columns of an RIS based on a periodic coding sequence. The communications manager 820 is capable of, configured to, or operable to support a means for transmitting a first signal to a second wireless communication device using a first harmonic frequency based on the one or more parameters. The communications manager 820 is capable of, configured to, or operable to support a means for transmitting a second signal to a third wireless communication device using a second harmonic frequency different from the first harmonic frequency based on the one or more parameters.

Additionally, or alternatively, the communications manager 820 may support wireless communications at a second wireless communication device in accordance with examples as disclosed herein. For example, the communications manager 820 is capable of, configured to, or operable to support a means for receiving a signal from a first wireless communication device using a harmonic frequency, where the signal is based on a periodic coding sequence and is associated with an RIS. The communications manager 820 is capable of, configured to, or operable to support a means for decoding the signal based on the periodic coding sequence and the harmonic frequency.

By including or configuring the communications manager 820 in accordance with examples as described herein, the device 805 may support techniques for faster processing, reduced latency, reduced power consumption, more efficient utilization of communication resources, longer battery life, and reduction in complexity and cost of hardware by multiplexing signals using an RIS at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of HDM for RISs as described herein, or the at least one processor 840 and the at least one memory 830 may be otherwise configured to, individually or collectively, perform or support such operations.

Figure 9:
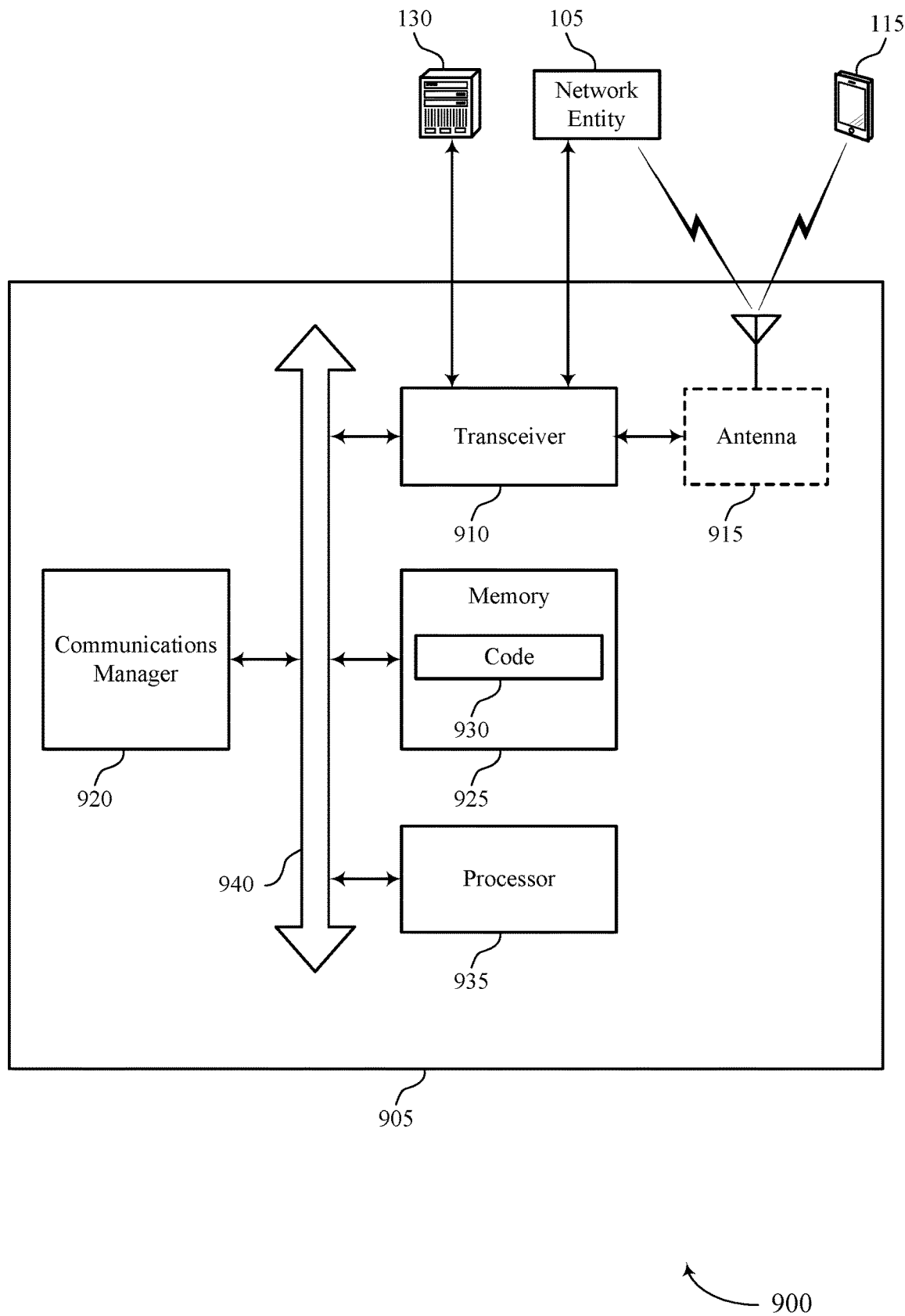
FIG. 9 shows a diagram of a system including a network entity that supports HDM for RISs in accordance with one or more aspects of the present disclosure.

FIG. 9 shows a diagram of a system 900 including a device 905 that supports HDM for RISs in accordance with one or more aspects of the present disclosure. The device 905 may be an example of or include the components of a device 505, a device 605, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925 (e.g., one or more memories 925), code 930 (e.g., processor-executable code 930), and at least one processor 935 (e.g., one or more processors 935). These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting HDM for RISs). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some implementations, the at least one processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the at least one processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a first wireless communication device in accordance with examples as disclosed herein. For example, the communications manager 920 is capable of, configured to, or operable to support a means for setting one or more parameters corresponding to one or more columns of an RIS based on a periodic coding sequence. The communications manager 920 is capable of, configured to, or operable to support a means for transmitting a first signal to a second wireless communication device using a first harmonic frequency based on the one or more parameters. The communications manager 920 is capable of, configured to, or operable to support a means for transmitting a second signal to a third wireless communication device using a second harmonic frequency different from the first harmonic frequency based on the one or more parameters.

Additionally, or alternatively, the communications manager 920 may support wireless communications at a second wireless communication device in accordance with examples as disclosed herein. For example, the communications manager 920 is capable of, configured to, or operable to support a means for receiving a signal from a first wireless communication device using a harmonic frequency, where the signal is based on a periodic coding sequence and is associated with an RIS. The communications manager 920 is capable of, configured to, or operable to support a means for decoding the signal based on the periodic coding sequence and the harmonic frequency.

By including or configuring the communications manager 920 in accordance with examples as described herein, the device 905 may support techniques for faster processing, reduced latency, reduced power consumption, more efficient utilization of communication resources, longer battery life, and reduction in complexity and cost of hardware by multiplexing signals using an RIS at the device 905.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of HDM for RISs as described herein, or the at least one processor 935 and the at least one memory 925 may be otherwise configured to, individually or collectively, perform or support such operations.

Figure 10:
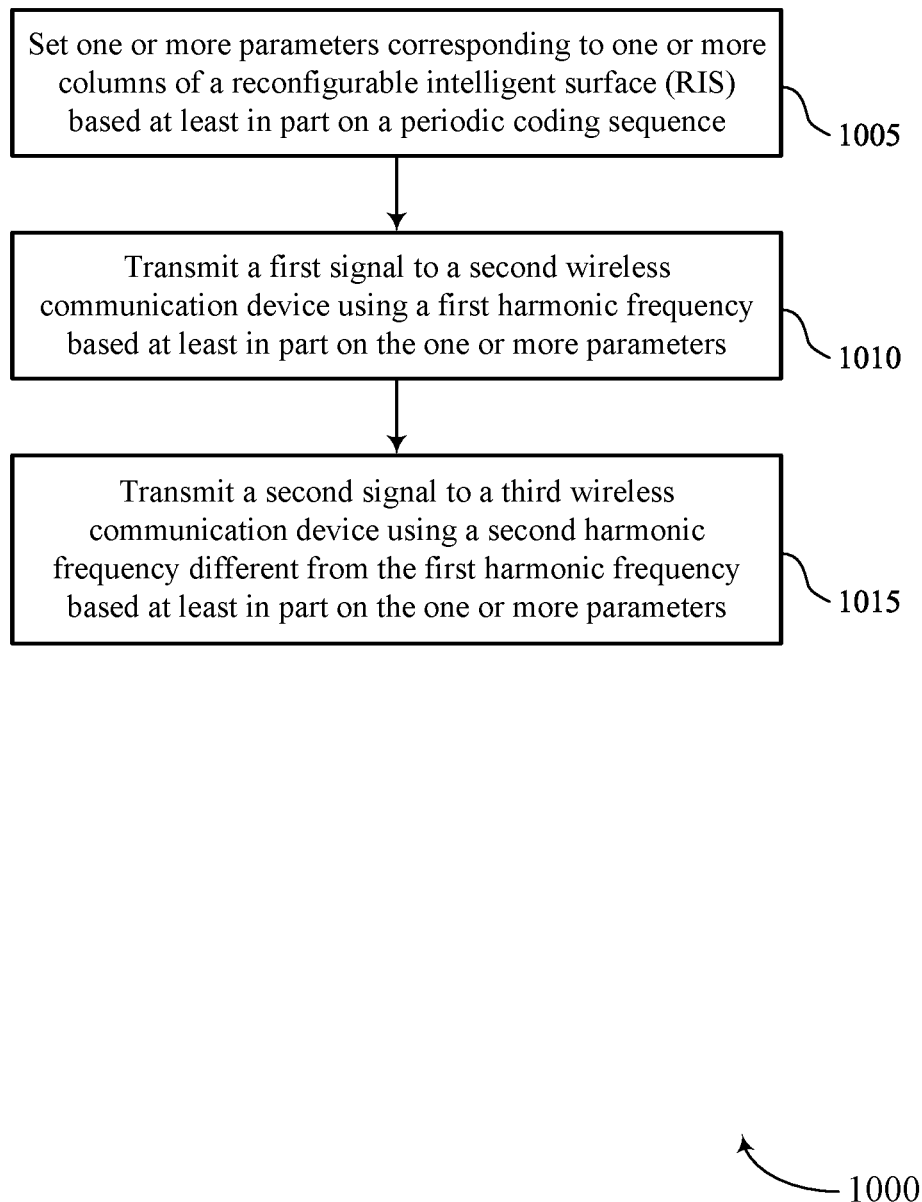
FIGS. 10 through 13 show flowcharts illustrating methods that support HDM for RISs in accordance with one or more aspects of the present disclosure.

FIG. 10 shows a flowchart illustrating a method 1000 that supports HDM for RISs in accordance with aspects of the present disclosure. The operations of the method 1000 may be implemented by a UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include setting one or more parameters corresponding to one or more columns of a reconfigurable intelligent surface (RIS) based at least in part on a periodic coding sequence. The operations of block 1005 may be performed in accordance with examples as disclosed herein. In some examples, aspects of the operations of 1005 may be performed by a parameter setting component 725 as described with reference to FIG. 7.

At 1010, the method may include transmitting a first signal to a second wireless communication device using a first harmonic frequency based at least in part on the one or more parameters. The operations of block 1010 may be performed in accordance with examples as disclosed herein. In some examples, aspects of the operations of 1010 may be performed by a signal component 730 as described with reference to FIG. 7.

At 1015, the method may include transmitting a second signal to a third wireless communication device using a second harmonic frequency different from the first harmonic frequency based at least in part on the one or more parameters. The operations of block 1015 may be performed in accordance with examples as disclosed herein. In some examples, aspects of the operations of 1015 may be performed by a signal component 730 as described with reference to FIG. 7.

Figure 11:
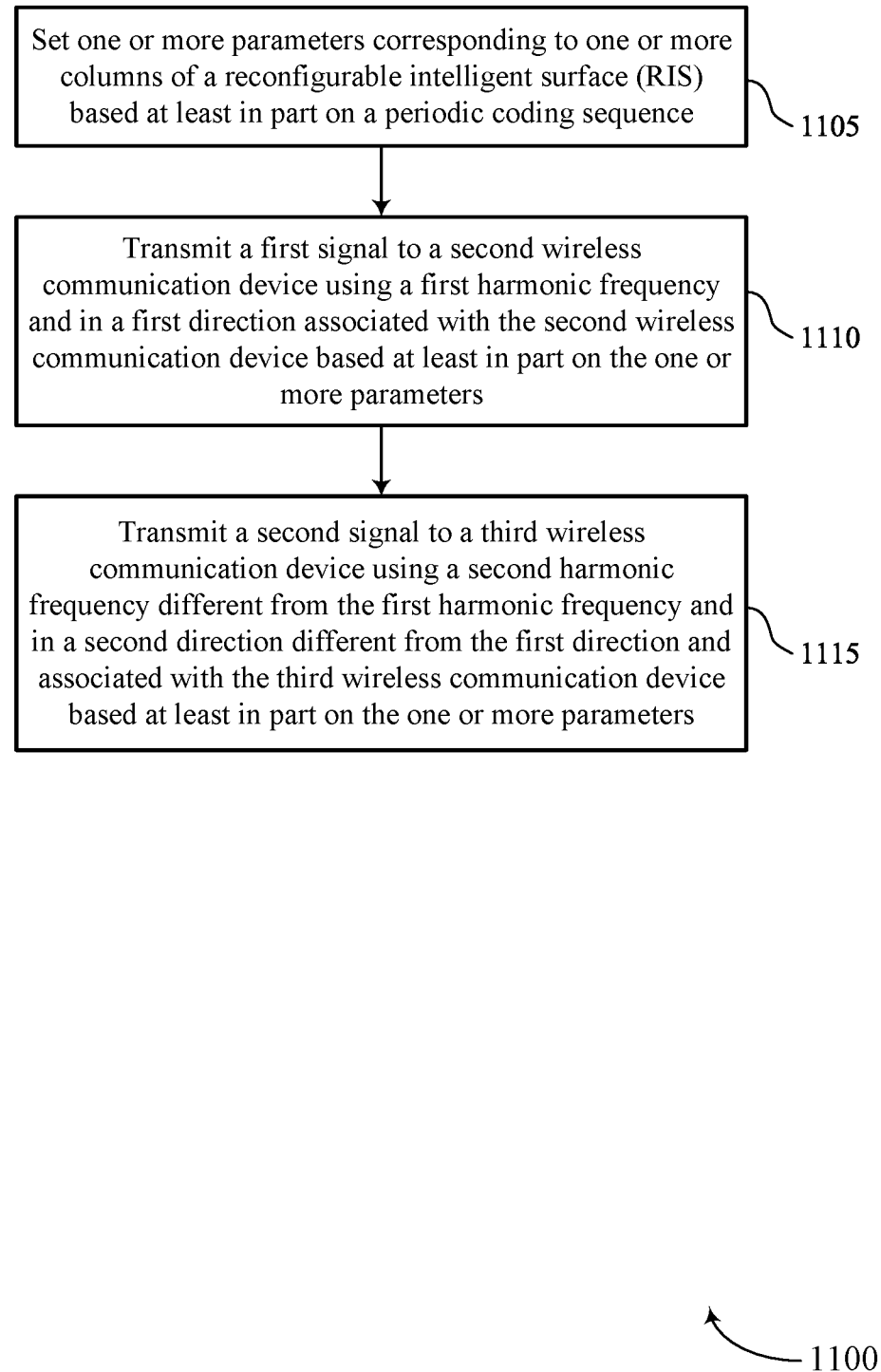

FIG. 11 shows a flowchart illustrating a method 1100 that supports HDM for RISs in accordance with aspects of the present disclosure. The operations of the method 1100 may be implemented by a UE or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include setting one or more parameters corresponding to one or more columns of a reconfigurable intelligent surface (RIS) based at least in part on a periodic coding sequence. The operations of block 1105 may be performed in accordance with examples as disclosed herein. In some examples, aspects of the operations of 1105 may be performed by a parameter setting component 725 as described with reference to FIG. 7.

At 1110, the method may include transmitting a first signal to a second wireless communication device using a first harmonic frequency and in a first direction associated with the second wireless communication device based at least in part on the one or more parameters. The operations of block 1110 may be performed in accordance with examples as disclosed herein. In some examples, aspects of the operations of 1110 may be performed by a signal component 730 as described with reference to FIG. 7.

At 1115, the method may include transmitting a second signal to a third wireless communication device using a second harmonic frequency different from the first harmonic frequency and in a second direction different from the first direction and associated with the third wireless communication device based at least in part on the one or more parameters. The operations of block 1115 may be performed in accordance with examples as disclosed herein. In some examples, aspects of the operations of 1115 may be performed by a signal component 730 as described with reference to FIG. 7.

Figure 12:
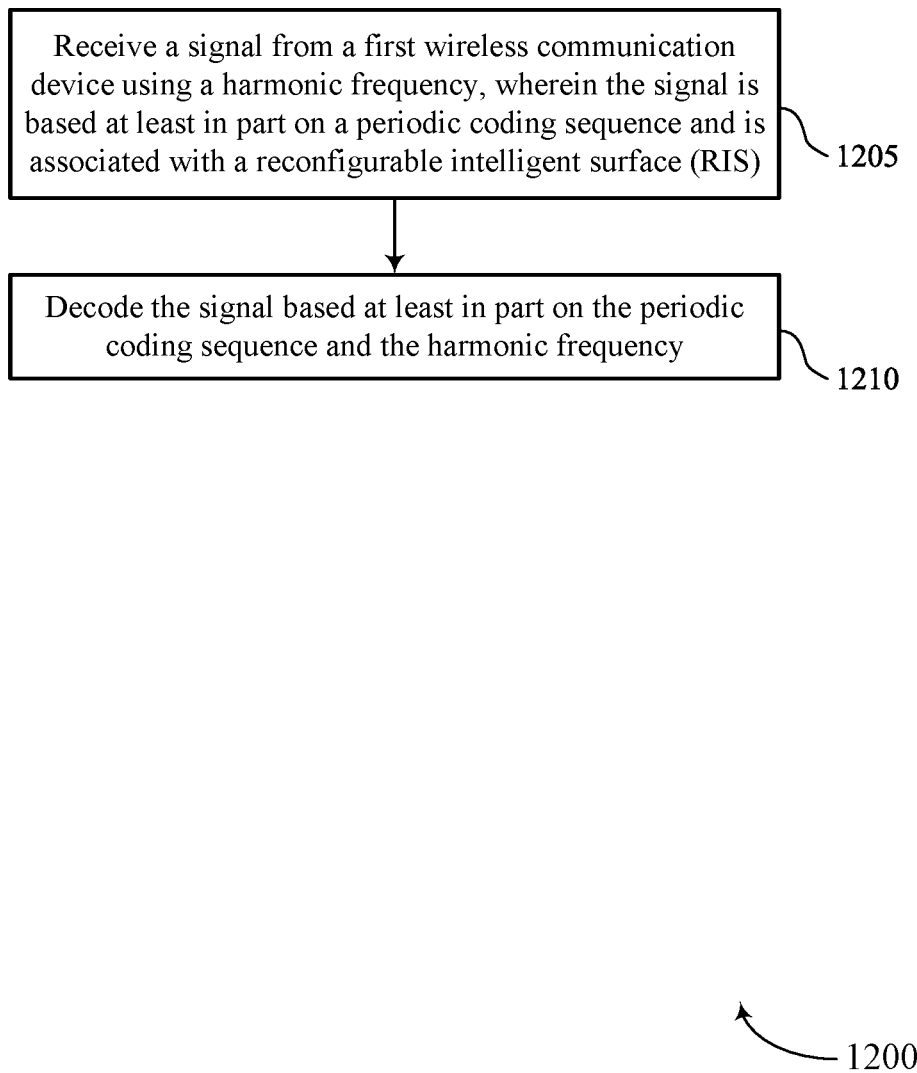

FIG. 12 shows a flowchart illustrating a method 1200 that supports HDM for RISs in accordance with aspects of the present disclosure. The operations of the method 1200 may be implemented by a UE or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include receiving a signal from a first wireless communication device using a harmonic frequency, wherein the signal is based at least in part on a periodic coding sequence and is associated with a reconfigurable intelligent surface (RIS). The operations of block 1205 may be performed in accordance with examples as disclosed herein. In some examples, aspects of the operations of 1205 may be performed by a signal component 730 as described with reference to FIG. 7.

At 1210, the method may include decoding the signal based at least in part on the periodic coding sequence and the harmonic frequency. The operations of block 1210 may be performed in accordance with examples as disclosed herein. In some examples, aspects of the operations of 1210 may be performed by a decoding component 735 as described with reference to FIG. 7.

Figure 13:
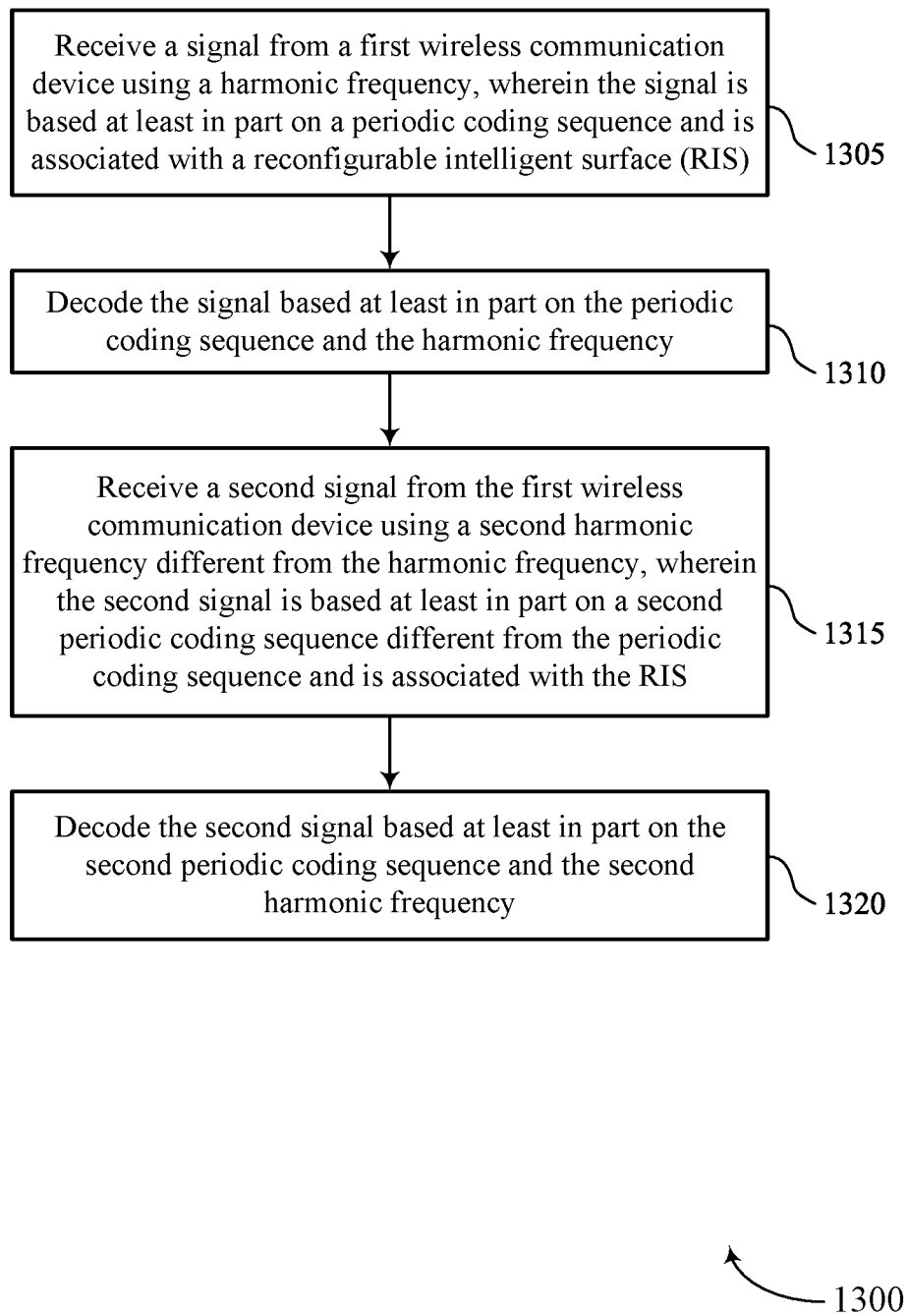

FIG. 13 shows a flowchart illustrating a method 1300 that supports HDM for RISs in accordance with aspects of the present disclosure. The operations of the method 1300 may be implemented by a UE or a network entity or its components as described herein. For example, the operations of the method 1300 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include receiving a signal from a first wireless communication device using a harmonic frequency, wherein the signal is based at least in part on a periodic coding sequence and is associated with a reconfigurable intelligent surface (RIS). The operations of block 1305 may be performed in accordance with examples as disclosed herein. In some examples, aspects of the operations of 1305 may be performed by a signal component 730 as described with reference to FIG. 7.

At 1310, the method may include decoding the signal based at least in part on the periodic coding sequence and the harmonic frequency. The operations of block 1310 may be performed in accordance with examples as disclosed herein. In some examples, aspects of the operations of 1310 may be performed by a decoding component 735 as described with reference to FIG. 7.

At 1315, the method may include receiving a second signal from the first wireless communication device using a second harmonic frequency different from the harmonic frequency, wherein the second signal is based at least in part on a second periodic coding sequence different from the periodic coding sequence and is associated with the RIS. The operations of block 1315 may be performed in accordance with examples as disclosed herein. In some examples, aspects of the operations of 1315 may be performed by a signal component 730 as described with reference to FIG. 7.

At 1320, the method may include decoding the second signal based at least in part on the second periodic coding sequence and the second harmonic frequency. The operations of block 1320 may be performed in accordance with examples as disclosed herein. In some examples, aspects of the operations of 1320 may be performed by a decoding component 735 as described with reference to FIG. 7.

The following provides an overview of aspects of the present disclosure:

Aspect 1: A method for wireless communication by a first wireless communication device, comprising: setting one or more parameters corresponding to one or more columns of a reconfigurable intelligent surface (RIS) based at least in part on a periodic coding sequence; transmitting a first signal to a second wireless communication device using a first harmonic frequency based at least in part on the one or more parameters; and transmitting a second signal to a third wireless communication device using a second harmonic frequency different from the first harmonic frequency based at least in part on the one or more parameters.

Aspect 2: The method of aspect 1, wherein transmitting the first signal using the first harmonic frequency and transmitting the second signal using the second harmonic frequency comprises: transmitting the first signal in a first direction associated with the second wireless communication device based at least in part on the one or more parameters; and transmitting the second signal in a second direction different from the first direction and associated with the third wireless communication device based at least in part on the one or more parameters.

Aspect 3: The method of aspect 2, wherein the first direction is based at least in part on a first phase shift corresponding to a first time delay applied to the periodic coding sequence, and wherein the second direction is based at least in part on a second phase shift corresponding to a second time delay applied to the periodic coding sequence.

Aspect 4: The method of any of aspects 2 through 3, wherein the first direction is based at least in part on the first harmonic frequency and a base frequency, and wherein the second direction is based at least in part on the second harmonic frequency and the base frequency.

Aspect 5: The method of any of aspects 1 through 4, further comprising: generating, at the RIS based at least in part on the one or more parameters, a first symbol comprising one or more bits corresponding to the periodic coding sequence, wherein the first symbol is transmitted in the first signal; and generating, at the RIS based at least in part on the one or more parameters, a second symbol comprising the one or more bits corresponding to the periodic coding sequence, wherein the second symbol is transmitted in the second signal.

Aspect 6: The method of aspect 5, wherein the first symbol is based at least in part on the first harmonic frequency and a base frequency, and wherein the second symbol is based at least in part on the second harmonic frequency and the base frequency.

Aspect 7: The method of any of aspects 1 through 6, further comprising: setting one or more second parameters corresponding to the one or more columns of the RIS based at least in part on a second periodic coding sequence different from the periodic coding sequence; transmitting a third signal to a fourth wireless communication device using a third harmonic frequency based at least in part on the one or more second parameters; and transmitting a fourth signal to a fifth wireless communication device using a fourth harmonic frequency different from the third harmonic frequency based at least in part on the one or more second parameters.

Aspect 8: The method of any of aspects 1 through 7, wherein the first harmonic frequency corresponds to a first order of a base frequency and the second harmonic frequency corresponds to a second order of the base frequency different from the first order.

Aspect 9: The method of any of aspects 1 through 8, wherein the first wireless communication device comprises a network entity.

Aspect 10: The method of any of aspects 1 through 9, wherein the second wireless communication device comprises a first UE, and wherein the third wireless communication device comprises a second UE.

Aspect 11: The method of any of aspects 1 through 8, wherein the first wireless communication device comprises a UE, and wherein the second wireless communication device, the third wireless communication device, or both, comprise a network entity.

Aspect 12: The method of any of aspects 1 through 11, wherein the first wireless communication device comprises the RIS, wherein the first signal and the second signal are transmitted using the RIS.

Aspect 13: A method for wireless communication by a second wireless communication device, comprising: receiving a signal from a first wireless communication device using a harmonic frequency, wherein the signal is based at least in part on a periodic coding sequence and is associated with a reconfigurable intelligent surface (RIS); and decoding the signal based at least in part on the periodic coding sequence and the harmonic frequency.

Aspect 14: The method of aspect 13, further comprising: refraining from receiving a second signal from the first wireless communication device using a second harmonic frequency different from the harmonic frequency, wherein the refraining is based at least in part on the second signal being associated with the second harmonic frequency.

Aspect 15: The method of aspect 14, wherein the second signal is based at least in part on the periodic coding sequence and is associated with a third wireless communication device.

Aspect 16: The method of any of aspects 13 through 15, wherein receiving the signal using the harmonic frequency comprises: receiving the signal in a first direction associated with the second wireless communication device, wherein the first direction is different from a second direction associated with a third wireless communication device.

Aspect 17: The method of aspect 16, wherein the first direction is associated with a first phase shift corresponding to a first time delay associated with the periodic coding sequence, and wherein the second direction is associated with a second phase shift corresponding to a second time delay associated with the periodic coding sequence.

Aspect 18: The method of any of aspects 16 through 17, wherein the first direction is based at least in part on the harmonic frequency and a base frequency, and wherein the second direction is based at least in part on a second harmonic frequency, different from the harmonic frequency, and the base frequency.

Aspect 19: The method of any of aspects 13 through 18, further comprising: determining a symbol comprising one or more bits received in the signal based at least in part on the decoding, wherein the symbol corresponds to the periodic coding sequence.

Aspect 20: The method of aspect 19, wherein the symbol is based at least in part on the harmonic frequency and a base frequency and is different from a second symbol based at least in part on a second harmonic frequency, different from the harmonic frequency, and the base frequency.

Aspect 21: The method of any of aspects 13 and 22 through 20, further comprising: receiving a second signal from the first wireless communication device using a second harmonic frequency different from the harmonic frequency, wherein the second signal is based at least in part on a second periodic coding sequence different from the periodic coding sequence and is associated with the RIS; and decoding the second signal based at least in part on the second periodic coding sequence and the second harmonic frequency.

Aspect 23: The method of any of aspects 13 through 21, wherein the harmonic frequency corresponds to a first order of a base frequency and different from a second order of the base frequency.

Aspect 24: The method of any of aspects 13 through 23, wherein the first wireless communication device comprises a network entity.

Aspect 25: The method of any of aspects 13 through 24, wherein the second wireless communication device comprises a UE.

Aspect 26: The method of any of aspects 13 through 23, wherein the first wireless communication device comprises a UE, and the second wireless communication device comprise a network entity.

Aspect 27: The method of any of aspects 13 through 26, wherein the first wireless communication device comprises the RIS, wherein the signal is received from the RIS.

Aspect 28: A first wireless communication device for wireless communication, comprising one or more memories storing processor-executable code; and one or more processors coupled with the one or more memories and individually or collectively operable to execute the code to cause the first wireless communication device to perform a method of any of aspects 1 through 12.

Aspect 29: A first wireless communication device for wireless communication, comprising at least one means for performing a method of any of aspects 1 through 12.

Aspect 30: A non-transitory computer-readable medium storing code for wireless communication by a first wireless communication device, the code comprising instructions executable by one or more processors to perform a method of any of aspects 1 through 12.

Aspect 31: A second wireless communication device for wireless communication, comprising one or more memories storing processor-executable code; and one or more processors coupled with the one or more memories and individually or collectively operable to execute the code to cause the second wireless communication device to perform a method of any of aspects 13 through 27.

Aspect 32: A second wireless communication device for wireless communication, comprising at least one means for performing a method of any of aspects 13 through 27.

Aspect 33: A non-transitory computer-readable medium storing code for wireless communication by a second wireless communication device, the code comprising instructions executable by one or more processors to perform a method of any of aspects 13 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless communication device for wireless communication, comprising:
   one or more memories storing processor-executable code; and
   one or more processors coupled with the one or more memories and individually or collectively operable to execute the code to cause the first wireless communication device to:
      set one or more parameters corresponding to one or more columns of a reconfigurable intelligent surface (RIS) based at least in part on a periodic coding sequence;
      transmit a first signal to a second wireless communication device using a first harmonic frequency based at least in part on the one or more parameters; and
      transmit a second signal to a third wireless communication device using a second harmonic frequency different from the first harmonic frequency based at least in part on the one or more parameters.

2. The first wireless communication device of claim 1, wherein, to transmit the first signal using the first harmonic frequency and to transmit the second signal using the second harmonic frequency, the one or more processors are individually or collectively operable to execute the code to cause the first wireless communication device to:
   transmit the first signal in a first direction associated with the second wireless communication device based at least in part on the one or more parameters; and
   transmit the second signal in a second direction different from the first direction and associated with the third wireless communication device based at least in part on the one or more parameters.

3. The first wireless communication device of claim 2, wherein the first direction is based at least in part on a first phase shift corresponding to a first time delay applied to the periodic coding sequence, and wherein the second direction is based at least in part on a second phase shift corresponding to a second time delay applied to the periodic coding sequence.

4. The first wireless communication device of claim 2, wherein the first direction is based at least in part on the first harmonic frequency and a base frequency, and wherein the second direction is based at least in part on the second harmonic frequency and the base frequency.

5. The first wireless communication device of claim 1, wherein the one or more processors are individually or collectively further operable to execute the code to cause the first wireless communication device to:
   generate, at the RIS based at least in part on the one or more parameters, a first symbol comprising one or more bits corresponding to the periodic coding sequence, wherein the first symbol is transmitted in the first signal; and
   generate, at the RIS based at least in part on the one or more parameters, a second symbol comprising the one or more bits corresponding to the periodic coding sequence, wherein the second symbol is transmitted in the second signal.

6. The first wireless communication device of claim 5, wherein the first symbol is based at least in part on the first harmonic frequency and a base frequency, and wherein the second symbol is based at least in part on the second harmonic frequency and the base frequency.

7. The first wireless communication device of claim 1, wherein the one or more processors are individually or collectively further operable to execute the code to cause the first wireless communication device to:
   set one or more second parameters corresponding to the one or more columns of the RIS based at least in part on a second periodic coding sequence different from the periodic coding sequence;
   transmit a third signal to a fourth wireless communication device using a third harmonic frequency based at least in part on the one or more second parameters; and
   transmit a fourth signal to a fifth wireless communication device using a fourth harmonic frequency different from the third harmonic frequency based at least in part on the one or more second parameters.

8. The first wireless communication device of claim 1, wherein the first harmonic frequency corresponds to a first order of a base frequency and the second harmonic frequency corresponds to a second order of the base frequency different from the first order.

9. The first wireless communication device of claim 1, wherein the first wireless communication device comprises a network entity.

10. The first wireless communication device of claim 1, wherein the second wireless communication device comprises a first user equipment (UE), and wherein the third wireless communication device comprises a second user equipment (UE).

11. The first wireless communication device of claim 1, wherein the first wireless communication device comprises a user equipment (UE), and wherein the second wireless communication device, the third wireless communication device, or both, comprise a network entity.

12. The first wireless communication device of claim 1, wherein the first wireless communication device comprises the RIS, wherein the first signal and the second signal are transmitted using the RIS.

13. A second wireless communication device for wireless communication, comprising:
one or more memories storing processor-executable code; and
one or more processors coupled with the one or more memories and individually or collectively operable to execute the code to cause the second wireless communication device to:
receive a signal from a first wireless communication device using a harmonic frequency, wherein the signal is based at least in part on a periodic coding sequence and is associated with a reconfigurable intelligent surface (RIS); and
decode the signal based at least in part on the periodic coding sequence and the harmonic frequency.

14. The second wireless communication device of claim 13, wherein the one or more processors are individually or collectively further operable to execute the code to cause the second wireless communication device to:
refrain from receiving a second signal from the first wireless communication device using a second harmonic frequency different from the harmonic frequency, wherein the refraining is based at least in part on the second signal being associated with the second harmonic frequency.

15. The second wireless communication device of claim 14, wherein the second signal is based at least in part on the periodic coding sequence and is associated with a third wireless communication device.

16. The second wireless communication device of claim 13, wherein, to receive the signal using the harmonic frequency, the one or more processors are individually or collectively operable to execute the code to cause the second wireless communication device to:
receive the signal in a first direction associated with the second wireless communication device, wherein the first direction is different from a second direction associated with a third wireless communication device.

17. The second wireless communication device of claim 16, wherein the first direction is associated with a first phase shift corresponding to a first time delay associated with the periodic coding sequence, and wherein the second direction is associated with a second phase shift corresponding to a second time delay associated with the periodic coding sequence.

18. The second wireless communication device of claim 16, wherein the first direction is based at least in part on the harmonic frequency and a base frequency, and wherein the second direction is based at least in part on a second harmonic frequency, different from the harmonic frequency, and the base frequency.

19. The second wireless communication device of claim 13, wherein the one or more processors are individually or collectively further operable to execute the code to cause the second wireless communication device to:
determine a symbol comprising one or more bits received in the signal based at least in part on the decoding, wherein the symbol corresponds to the periodic coding sequence.

20. The second wireless communication device of claim 19, wherein the symbol is based at least in part on the harmonic frequency and a base frequency and is different from a second symbol based at least in part on a second harmonic frequency, different from the harmonic frequency, and the base frequency.

21. The second wireless communication device of claim 13, wherein the one or more processors are individually or collectively further operable to execute the code to cause the second wireless communication device to:
receive a second signal from the first wireless communication device using a second harmonic frequency different from the harmonic frequency, wherein the second signal is based at least in part on a second periodic coding sequence different from the periodic coding sequence and is associated with the RIS; and
decode the second signal based at least in part on the second periodic coding sequence and the second harmonic frequency.

22. The second wireless communication device of claim 13, wherein the harmonic frequency corresponds to a first order of a base frequency and different from a second order of the base frequency.

23. The second wireless communication device of claim 13, wherein the first wireless communication device comprises a network entity.

24. The second wireless communication device of claim 13, wherein the second wireless communication device comprises a user equipment (UE).

25. The second wireless communication device of claim 13, wherein the first wireless communication device comprises a user equipment (UE), and wherein the second wireless communication device comprise a network entity.

26. The second wireless communication device of claim 13, wherein the first wireless communication device comprises the RIS, wherein the signal is received from the RIS.

27. A method for wireless communications by a first wireless communication device, comprising:
setting one or more parameters corresponding to one or more columns of a reconfigurable intelligent surface (RIS) based at least in part on a periodic coding sequence;
transmitting a first signal to a second wireless communication device using a first harmonic frequency based at least in part on the one or more parameters; and
transmitting a second signal to a third wireless communication device using a second harmonic frequency different from the first harmonic frequency based at least in part on the one or more parameters.

28. The method of claim 27, wherein transmitting the first signal using the first harmonic frequency and transmitting the second signal using the second harmonic frequency comprises:
transmitting the first signal in a first direction associated with the second wireless communication device based at least in part on the one or more parameters; and
transmitting the second signal in a second direction different from the first direction and associated with the third wireless communication device based at least in part on the one or more parameters.

29. A method for wireless communications by a second wireless communication device, comprising:

receiving a signal from a first wireless communication device using a harmonic frequency, wherein the signal is based at least in part on a periodic coding sequence and is associated with a reconfigurable intelligent surface (RIS); and decoding the signal based at least in part on the periodic coding sequence and the harmonic frequency.

30. The method of claim 29, further comprising:

refraining from receiving a second signal from the first wireless communication device using a second harmonic frequency different from the harmonic frequency, wherein the refraining is based at least in part on the second signal being associated with the second harmonic frequency.

* * * * *